(12) United States Patent
Chen

(10) Patent No.: US 12,166,647 B2
(45) Date of Patent: Dec. 10, 2024

(54) DATA TRANSMISSION METHOD AND ELECTRONIC DEVICE

(71) Applicant: Huawei Technologies Co., Ltd., Shenzhen (CN)

(72) Inventor: Xiaogang Chen, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/192,984

(22) Filed: Mar. 30, 2023

(65) Prior Publication Data

US 2023/0239218 A1  Jul. 27, 2023

Related U.S. Application Data

(63) Continuation of application No. PCT/CN2021/119591, filed on Sep. 22, 2021.

(30) Foreign Application Priority Data

Sep. 30, 2020 (CN) .......................... 202011064467.4

(51) Int. Cl.
  *H04L 41/22* (2022.01)
  *G06F 3/0482* (2013.01)
(52) U.S. Cl.
  CPC ............ *H04L 41/22* (2013.01); *G06F 3/0482* (2013.01)

(58) Field of Classification Search
  CPC ......... H04L 41/22; H04L 69/18; H04L 67/75; G06F 3/0482; G06F 3/04842; G06F 3/0488; G06F 9/451; H04W 8/005; H04W 4/80
  See application file for complete search history.

(56) References Cited

U.S. PATENT DOCUMENTS

| 2012/0208462 | A1 | 8/2012 | Lee et al. |
| 2014/0192681 | A1 | 7/2014 | Hong et al. |
| 2019/0268749 | A1 | 8/2019 | Jiang et al. |
| 2019/0320369 | A1 | 10/2019 | Yang et al. |
| 2021/0312917 | A1* | 10/2021 | Weksler .................. G06F 3/167 |
| 2022/0188067 | A1* | 6/2022 | Kim ...................... G06F 3/0482 |

FOREIGN PATENT DOCUMENTS

| CN | 102201846 A | 9/2011 |
| CN | 104394600 A | 3/2015 |
| CN | 106792954 A | 5/2017 |
| WO | 2013100994 A1 | 7/2013 |
| WO | 2018120389 A1 | 7/2018 |

* cited by examiner

Primary Examiner — Cao H Nguyen
(74) Attorney, Agent, or Firm — Conley Rose, P.C.

(57) ABSTRACT

A first device selects a first transmission manner to send data to a second device. If it is determined that both the second device and the first device support a second transmission manner, the first transmission manner is switched to the second transmission manner, and the data is sent to the second device in the second transmission manner.

19 Claims, 26 Drawing Sheets

DATA TRANSMISSION METHOD AND ELECTRONIC DEVICE

CROSS-REFERENCE TO RELATED APPLICATIONS

This is a continuation of International Patent Application No. PCT/CN2021/119591 filed on Sep. 22, 2021, which claims priority to Chinese Patent Application No. 202011064467.4 filed on Sep. 30, 2020. The disclosures of the aforementioned applications are hereby incorporated by reference in their entireties.

TECHNICAL FIELD

This disclosure relates to the field of terminal technologies, and in particular, to a data transmission method and an electronic device.

BACKGROUND

With the development of society and technology, intelligent devices such as a personal computer, a notebook computer, a tablet computer, and a smartphone are increasingly widely used. When these intelligent devices are used to exchange information, these devices sometimes need to transmit data, to facilitate viewing or access by users.

Currently, different terminal devices may transmit data in a BLUETOOTH or a wireless local area network (WLAN) Direct manner. In the foregoing two manners, because relatively few electronic devices support WLAN Direct, data is usually transmitted through BLUETOOTH. However, when data is transmitted through BLUETOOTH, a transmission speed is relatively slow. Therefore, how to quickly transmit data between different devices is a problem to be resolved.

SUMMARY

This disclosure provides a data transmission method and an electronic device, to improve data transmission efficiency.

According to a first aspect, this disclosure provides a data transmission method. The method includes: a first device displays a first interface in response to a user operation of requesting to send to-be-transmitted data, where the first interface includes at least one transmission manner option, and the at least one transmission manner option includes a first transmission manner option; the first device displays a second interface in response to a user operation of selecting the first transmission manner option, where the second interface includes a discovered device list, the discovered device list includes information about at least one device that is discovered by the first device and that supports a first transmission manner, the information about the at least one device includes identification information of a second device and first indication information, the first indication information is displayed in the discovered device list by the first device based on second indication information carried in a broadcast message from the second device, and the first indication information and the second indication information are used to indicate that the second device supports a second transmission manner; and in response to a user operation of selecting the second device, the first device sends the to-be-transmitted data to the second device in the second transmission manner if it is determined that the first device supports the second transmission manner.

According to the foregoing technical solution, when the first device selects to send data to the second device in the first transmission manner, if it is determined that both the first device and the second device support the second transmission manner, the first device switches the first transmission manner to the second transmission manner, and sends the data to the second device in the second transmission manner. In this way, data transmission time can be shortened, and data transmission efficiency can be improved.

In a possible design, before the to-be-transmitted data is sent to the second device in the second transmission manner, the method further includes: the first device negotiates, with the second device through a transmission link in the first transmission manner, information used to establish a transmission link in the second transmission manner.

According to the foregoing technical solution, the first device may negotiate, with the second device through the transmission link in the first transmission manner, the information used to establish the transmission link in the second transmission manner, to establish the transmission link in the second transmission manner, and transmit data to the second device in the second transmission manner. In this way, establishment of the second transmission link is directly negotiated through the link in the first transmission manner, so that data transmission link switching time can be shortened, and data transmission efficiency can be improved.

In a possible design, the method further includes: disconnecting the transmission link in the first transmission manner after the transmission link in the second transmission manner is established.

According to the foregoing technical solution, after the second transmission link to the second device is established, the first device may disconnect the transmission link in the first transmission manner, and transmit data to the second device in the second transmission manner, so that data transmission time is shortened.

In a possible design, the method further includes: the first device determines whether the second transmission manner is enabled on the first device.

If the second transmission manner is enabled on the first device, the first device may directly transmit data to the second device in the second transmission manner. If the second transmission manner is not enabled on the first device, first prompt information may be displayed on the first device, where the first prompt information may be used to prompt to enable the second transmission manner of the first device. The first device may enable the second transmission manner of the first device in response to a user operation of enabling the second transmission manner of the first device, and then transmit data to the second device in the second transmission manner.

According to the foregoing technical solution, after the second transmission manner is not enabled on the first device, the first device may display prompt information, to prompt a user to enable the second transmission manner on the first device. In this way, user experience can be improved. Certainly, if the second transmission manner is not enabled on the first device, the second transmission manner of the first device may alternatively be automatically enabled when it is determined that both the first device and the second device support the second transmission manner. This is not limited in this disclosure.

In a possible implementation, the information about the at least one device included in an available device list may further include third indication information. The third indication information may be used to indicate whether the second transmission manner is enabled on the second device. For example, a color of an icon may be used to indicate whether the second transmission manner is enabled on the second device. For example, when a color of an icon indicating that the second transmission manner is supported is blue, it may indicate that the second transmission manner is enabled on the second device. When the color of the icon indicating that the second transmission manner is supported is gray, it may indicate that the second transmission manner is not enabled on the second device.

The first device may determine, based on the third indication information, whether the second transmission manner is enabled on the second device, where the third indication information is displayed in the discovered device list by the first device based on fourth indication information carried in the broadcast message from the second device, and the third indication information and the fourth indication information are used to indicate whether the second transmission manner is enabled on the second device; the first device displays second prompt information on the first device if it is determined that the second transmission manner is not enabled on the second device, where the second prompt information is used to prompt that the second transmission manner is not enabled on the second device; and the first device sends a notification message to the second device, where the notification message is used to trigger the second device to display third prompt information, and the third prompt information is used to prompt to enable the second transmission manner of the second device.

According to the foregoing technical solution, if the second transmission manner is not enabled on the second device, the first device may send the notification message to the second device. In this way, after receiving the notification message, the second device may remind a user using the second device, to enable the second transmission manner of the second device.

In a possible design, the method further includes: the first device sends the to-be-transmitted data to the second device in the first transmission manner if it is determined that the first device does not support the second transmission manner.

According to the foregoing technical solution, if the first device selects to transmit data to the second device in the first transmission manner, but the first device does not support the second transmission manner, the first device still transmits the data to the second device in the first transmission manner.

In a possible design, the first transmission manner is a BLUETOOTH transmission manner, and the second transmission manner is a WI-FI peer-to-peer (P2P) transmission manner.

According to the foregoing technical solution, if the first device selects to transmit data to the second device in the BLUETOOTH transmission manner, and if it is determined that both the first device and the second device support WI-FI P2P transmission when the second device is selected, the first device switches BLUETOOTH transmission to WI-FI P2P transmission, and transmits the data to the second device in the WI-FI P2P transmission manner. Compared with that in BLUETOOTH data transmission, in WI-FI P2P data transmission, data transmission time can be shortened, and data transmission efficiency can be improved.

According to a second aspect, this disclosure further provides an electronic device. The electronic device includes a display, one or more processors, a memory, a plurality of applications, and one or more computer programs. The one or more computer programs are stored in the memory, the one or more computer programs include instructions, and when the instructions are invoked and executed by the one or more processors, the electronic device is enabled to perform the technical solution according to any one of the first aspect and the possible designs of the first aspect.

According to a third aspect, this disclosure further provides an electronic device. The electronic device includes modules/units that are configured to perform the method according to any one of the first aspect and the possible designs of the first aspect. The modules/units may be implemented by hardware, or may be implemented by hardware by executing corresponding software.

According to a fourth aspect, embodiments of this disclosure further provide a chip. The chip is coupled to a memory in an electronic device, to perform the technical solution according to any one of the first aspect and the possible designs of the first aspect in embodiments of this disclosure. In embodiments of this disclosure, "coupling" means that two components are directly or indirectly connected to each other.

According to a fifth aspect, embodiments of this disclosure further provide a computer-readable storage medium. The computer-readable storage medium includes a computer program. When the computer program is run on an electronic device, the electronic device is enabled to perform the technical solution according to any one of the first aspect and the possible designs of the first aspect in embodiments of this disclosure.

According to a sixth aspect, embodiments of this disclosure further provide a computer program product. When the computer program product runs on an electronic device, the electronic device is enabled to perform the technical solution according to any one of the first aspect and the possible designs of the first aspect in embodiments of this disclosure.

For the second aspect to the sixth aspect and technical effects that can be achieved in the second aspect to the sixth aspect, refer to the description of the technical effects that can be achieved in the possible solutions in the first aspect. Details are not described herein again.

DESCRIPTION OF EMBODIMENTS

The following describes the technical solutions in embodiments of this disclosure with reference to the accompanying drawings in embodiments of this disclosure.

The following describes some terms in embodiments of this disclosure, to facilitate understanding of a person skilled in the art.

(1) Application (App): The application is referred to as App for short, and is a software program that can implement one or more specific functions. Usually, a plurality of applications may be installed in an electronic device, for example, a camera application, a short messaging service (SMS) message application, a mailbox application, WECHAT, WHATSAPP Messenger, LINE, INSTAGRAM, KAKAO Talk, and DINGTALK. An application in the following may be an application installed before delivery of the electronic device, or may be an application downloaded from a network or obtained from another electronic device by a user when the electronic device is used.

(2) BLUETOOTH: BLUETOOTH is a radio technology that supports short-distance communications between devices, and can be used to exchange wireless information between a plurality of devices such as mobile phones, wireless headsets, notebook computers, and related peripherals. The "BLUETOOTH" technology can be used to effectively simplify communications between mobile communications terminal devices, and successfully simplify communications between a device and the Internet, so that data is transmitted more rapidly and efficiently, and a path for wireless communications is widened.

(3) WI-FI P2P: WI-FI P2P is also referred to as WLAN Direct or WI-FI Direct, is included in the WI-FI protocol suite, and enables devices to easily connect to each other without requiring an intermediate wireless access point. Its usage ranges from web browsing to file transfer. WI-FI Direct enables a plurality of devices to communicate with each other at the same time, making full use of the WI-FI speed advantage. Devices that comply with this standard can be easily interconnected even if they come from different manufacturers.

It should be noted that a data transmission method according to embodiments of this disclosure may be applied to any electronic device having a display, for example, a mobile phone, a tablet computer, a wearable device (such as a watch, a band, and a smart helmet), a vehicle-mounted device, smart home, an augmented reality (AR)/virtual reality (VR) device, a notebook computer, an ultra-mobile personal computer (UMPC), a netbook, or a personal digital assistant (PDA), which is not limited in embodiments of this disclosure. The electronic device in embodiments of this disclosure may alternatively be a foldable electronic device, for example, a foldable mobile phone or a foldable tablet computer. This is not limited in this disclosure.

The following describes a structure of an electronic device by using a mobile phone as an example.

Figure 1:
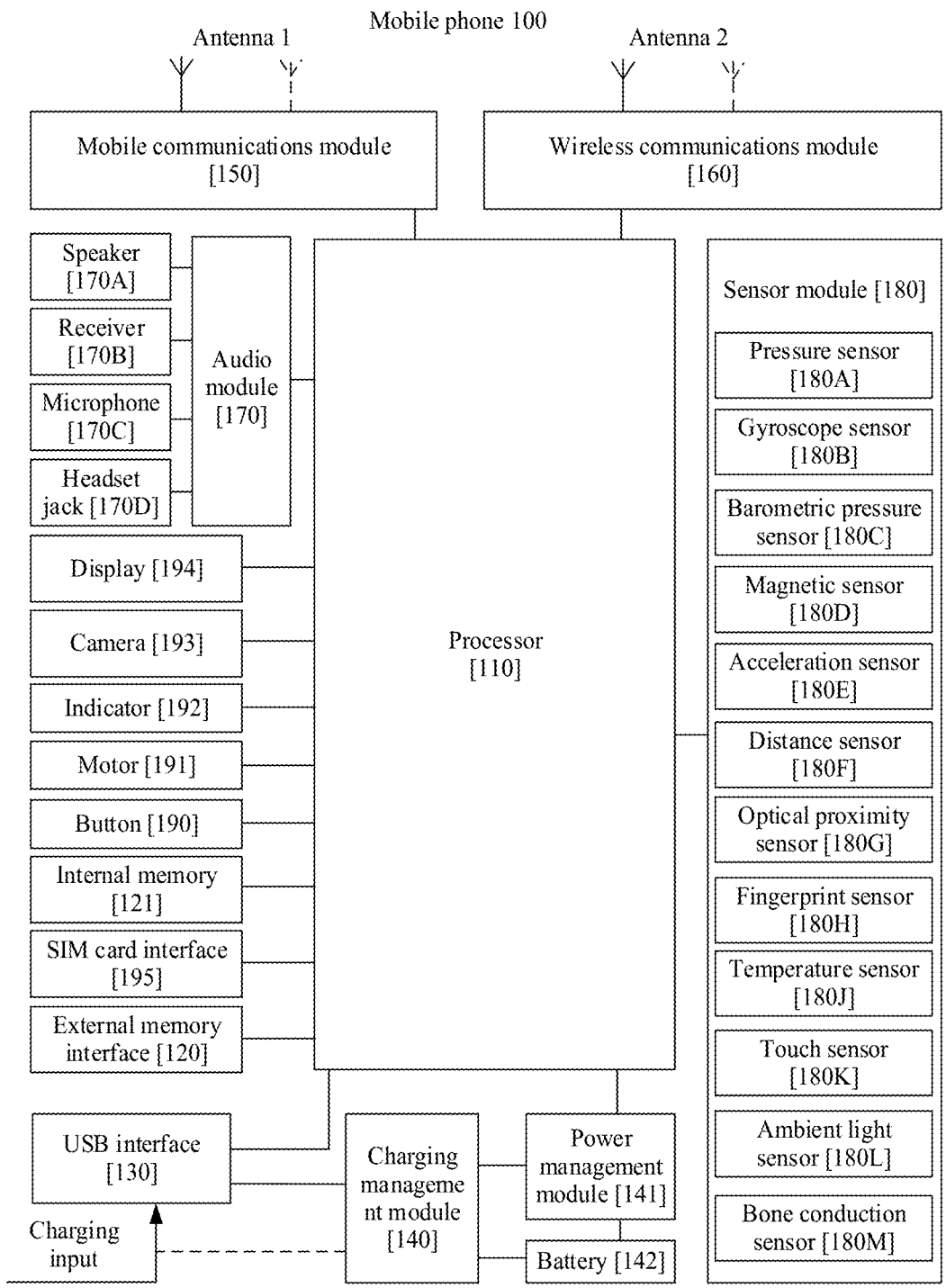
FIG. 1 is a schematic diagram of a structure of an electronic device according to an embodiment of this disclosure.

As shown in FIG. 1, the mobile phone 100 may include a processor 110, an external memory interface 120, an internal memory 121, a Universal Serial Bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors. The controller may be a nerve center and a command center of the mobile phone 100. The controller may generate an operation control signal based on an instruction operation code and a time sequence signal, to complete control of instruction fetching and instruction execution. A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110, thereby improving system efficiency.

The USB interface 130 is an interface that conforms to a USB standard specification, and may be a mini USB interface, a micro USB interface, a USB Type-C interface, or the like. The USB interface 130 may be configured to connect to a charger to charge the mobile phone 100, or may be configured to perform data transmission between the mobile phone 100 and a peripheral device. The charging management module 140 is configured to receive a charging input from the charger. The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like.

A wireless communications function of the mobile phone 100 may be implemented through the antenna 1, the antenna 2, the mobile communications module 150, the wireless communications module 160, the modem processor, the baseband processor, and the like. The antenna 1 and the antenna 2 are configured to: transmit and receive electromagnetic wave signals. Each antenna in the mobile phone 100 may be configured to cover one or more communications frequency bands. Different antennas may be further multiplexed to improve antenna utilization. For example, the antenna 1 may be multiplexed as a diversity antenna in a WLAN. In some other embodiments, the antenna may be used in combination with a tuning switch.

The mobile communications module 150 may provide a wireless communication solution that includes 2G/3G/4G/5G or the like and that is applied to the mobile phone 100. The mobile communications module 150 may include at least one filter, a switch, a power amplifier, a low-noise amplifier (LNA), and the like. The mobile communications module 150 may receive an electromagnetic wave through the antenna 1, perform processing such as filtering and amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 and at least some modules of the processor 110 may be disposed in a same device.

The wireless communications module 160 may provide a wireless communications solution that is applied to the mobile phone 100 and that includes a WLAN (for example, a WI-FI network), BLUETOOTH, a Global Navigation Satellite System (GNSS), frequency modulation (FM), near-field communication (NFC), an infrared (IR) technology, or the like. The wireless communications module 160 may be one or more devices integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2. For example, in embodiments of this disclosure, different electronic devices may be communicated with each other through BLUETOOTH or by using a WLAN.

In some embodiments, in the mobile phone 100, the antenna 1 and the mobile communications module 150 are coupled, and the antenna 2 and the wireless communications module 160 are coupled, so that the mobile phone 100 can communicate with a network and another device by using a wireless communications technology. The wireless communications technology may include a Global System for Mobile Communications (GSM), a General Packet Radio Service (GPRS), code-division multiple access (CDMA), wideband code-division multiple access (WCDMA), time-division code-division multiple access (TD-CDMA), Long-Term Evolution (LTE), BLUETOOTH, a GNSS, a WLAN, NFC, FM, an IR technology, and/or the like. The GNSS may include a Global Positioning System (GPS), a Global Navigation Satellite System (GLONASS), a BEIDOU navigation satellite system (BDS), a Quasi-Zenith Satellite System (QZSS), and/or a satellite based augmentation system (SBAS).

The display 194 is configured to display a display interface of an application, and the like. The display 194 includes a display panel. The display panel may use a liquid-crystal display (LCD), an organic light-emitting diode (OLED), an active-matrix organic light-emitting diode (AMOLED), a flexible light-emitting diode (FLED), a mini light-emitting diode (mini-LED), a micro light-emitting diode (micro-LED), a micro-OLED, a quantum dot light-emitting diode (QLED), or the like. In some embodiments, the mobile phone 100 may include one or N displays 194, where N is a positive integer greater than 1. In embodiments of this disclosure, the display 194 may be configured to simultaneously display a plurality of application interfaces.

The camera 193 is configured to capture a static image or a video. The camera 193 may include a front-facing camera and a rear-facing camera.

The internal memory 121 may be configured to store computer-executable program code. The executable program code includes instructions. The processor 110 runs the instructions stored in the internal memory 121, to perform various function applications of the mobile phone 100 and data processing. The internal memory 121 may include a program storage area and a data storage area. The program storage area may store an operating system, software code of at least one application (for example, iQIYI or WECHAT), and the like. The data storage area may store data (for example, an image and a video) and the like created when the mobile phone 100 is used. In addition, the internal memory 121 may include a high-speed random-access memory (RAM), and may further include a nonvolatile memory, for example, at least one magnetic disk storage device, a flash memory device, or a Universal Flash Storage (UFS).

The external memory interface 120 may be configured to connect to an external storage card, for example, a micro Secure Digital (SD) card, to extend a storage capability of the mobile phone 100. The external memory card communicates with the processor 110 through the external memory interface 120, to implement a data storage function. For example, files such as images or videos are stored in the external memory card.

The mobile phone 100 may implement an audio function such as music playing or recording by using the audio module 170, the speaker 170A, the receiver 170B, the microphone 170C, the headset jack 170D, the application processor, and the like.

The pressure sensor 180A is configured to sense a pressure signal, and may convert the pressure signal into an electrical signal. In some embodiments, the pressure sensor 180A may be disposed on the display 194. The gyroscope sensor 180B may be configured to determine a motion posture of the mobile phone 100. In some embodiments, an angular velocity of the mobile phone 100 around three axes (namely, axes x, y, and z) may be determined by using the gyroscope sensor 180B.

The gyroscope sensor 180B may be configured to implement image stabilization during photographing. The barometric pressure sensor 180C is configured to measure barometric pressure. In some embodiments, the mobile phone 100 calculates an altitude based on a barometric pressure value measured by the barometric pressure sensor 180C, to assist in positioning and navigation. The magnetic sensor 180D includes a Hall sensor. The mobile phone 100 may detect opening and closing of a flip cover by using the magnetic sensor 180D. In some embodiments, when the mobile phone 100 is a flip phone, the mobile phone 100 may detect opening and closing of a flip cover based on the magnetic sensor 180D. Further, a feature such as automatic unlocking of the flip cover is set based on a detected opening or closing state of the leather case or a detected opening or closing state of the flip cover. The acceleration sensor 180E may detect a magnitude of acceleration of the mobile phone 100 in various directions (usually on three axes). When the mobile phone 100 is static, a value and a direction of gravity may be detected. The acceleration sensor 180E may be further configured to identify a posture of the electronic device, and is used in screen switching between a landscape mode and a portrait mode, a pedometer, or another application.

The distance sensor 180F is configured to measure a distance. The mobile phone 100 may measure a distance in an infrared or a laser manner. In some embodiments, in a photographing scenario, the mobile phone 100 may measure a distance by using the distance sensor 180F, to implement quick focusing. The optical proximity sensor 180G may include, for example, a light-emitting diode (LED) and an optical detector, for example, a photodiode. The LED may be an infrared LED. The mobile phone 100 emits infrared light by using the LED. The mobile phone 100 detects infrared reflected light from a nearby object by using the photodiode. When sufficient reflected light is detected, the mobile phone 100 may determine that there is an object near the mobile phone 100. When insufficient reflected light is detected, the mobile phone 100 may determine that there is no object near the mobile phone 100. The mobile phone 100 may detect, by using the optical proximity sensor 180G, that the user holds the mobile phone 100 close to an ear to make a call, to automatically perform screen-off for power saving. The optical proximity sensor 180G may also be configured to automatically unlock and lock a screen in a flip cover mode and a pocket mode.

The ambient light sensor 180L is configured to sense ambient light brightness. The mobile phone 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the mobile phone 100 is in a pocket, to avoid an accidental touch. The fingerprint sensor 180H is configured to collect a fingerprint. The mobile phone 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the mobile phone 100 executes a temperature processing policy by using the temperature detected by the temperature sensor 180J. For example, when the temperature reported by the temperature sensor 180J exceeds a threshold, the mobile phone 100 lowers performance of a processor near the temperature sensor 180J, to reduce power consumption for thermal protection. In some other embodiments, when the temperature is less than another threshold, the mobile phone 100 heats the battery 142 to prevent the mobile phone 100 from being shut down abnormally because of a low temperature. In some other embodiments, when the temperature is less than still another threshold, the mobile phone 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor, to determine a type of a touch event. A visual output related to the touch operation may be provided on the display 194. In some other embodiments, the touch sensor 180K may alternatively be disposed on a surface of the mobile phone 100, and is located on a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a blood pressure beating signal.

The button 190 includes a power button, a volume button, and the like. The button 190 may be a mechanical button, or may be a touch button. The mobile phone 100 may receive a button input, and generate a button signal input related to a user setting and function control of the mobile phone 100. The motor 191 may generate a vibration prompt. The motor 191 may be configured to provide an incoming call vibration prompt or a touch vibration feedback. For example, touch operations performed on different applications (for example, photographing and audio playback) may correspond to different vibration feedback effects. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or detached from the SIM card interface 195, to implement contact with or separation from the mobile phone 100.

It may be understood that the components shown in FIG. 1 do not constitute a specific limitation on the mobile phone. The mobile phone may further include more or fewer components than those shown in the figure, or some components may be combined, or some components may be split, or different component arrangements may be used. In the following embodiments, the mobile phone 100 shown in FIG. 1 is used as an example for description.

The following describes processes of transmitting data through BLUETOOTH and WI-FI P2P by using an example in which a photo in a gallery of a mobile phone 1 is shared with a mobile phone 2.

Figure 2A:
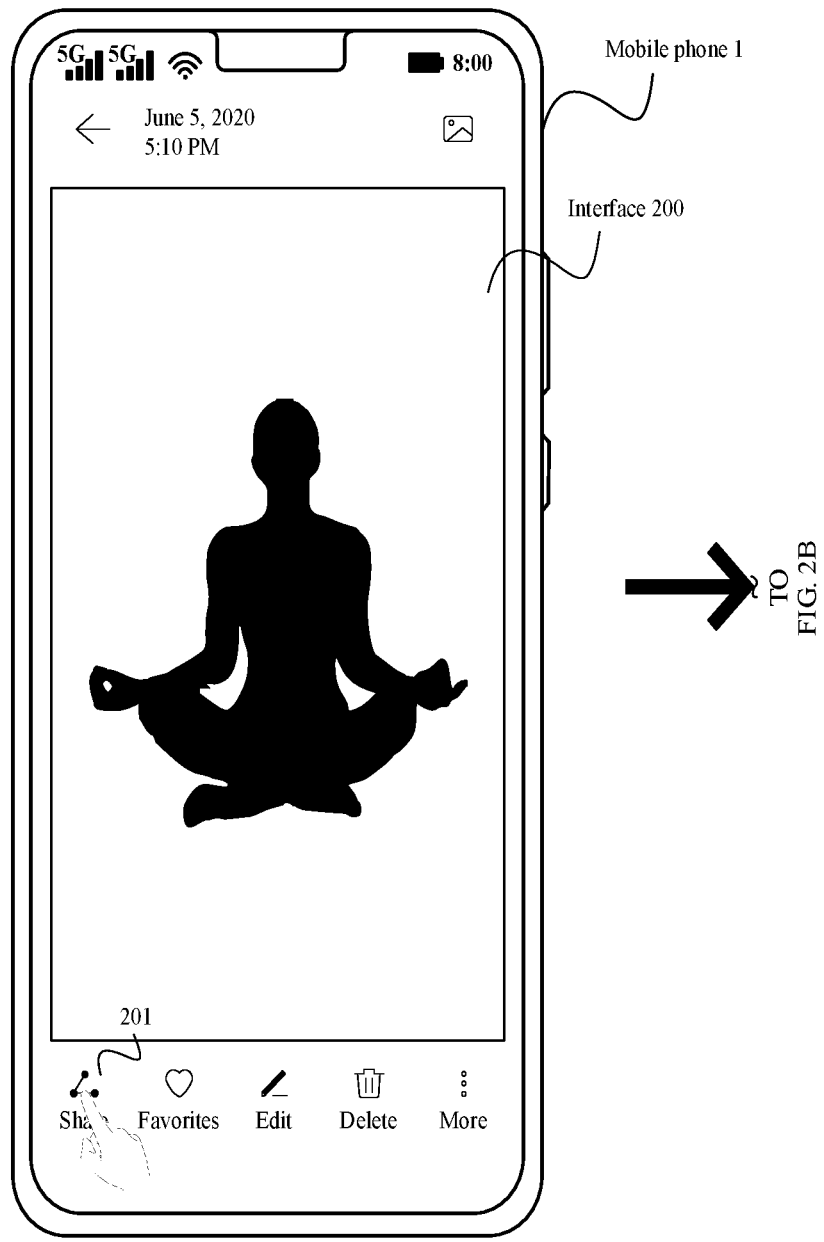
FIG. 2A, FIG. 2B, and FIG. 2C are schematic diagrams of interfaces for data transmission through BLUETOOTH according to an embodiment of this disclosure.
Figure 2B:
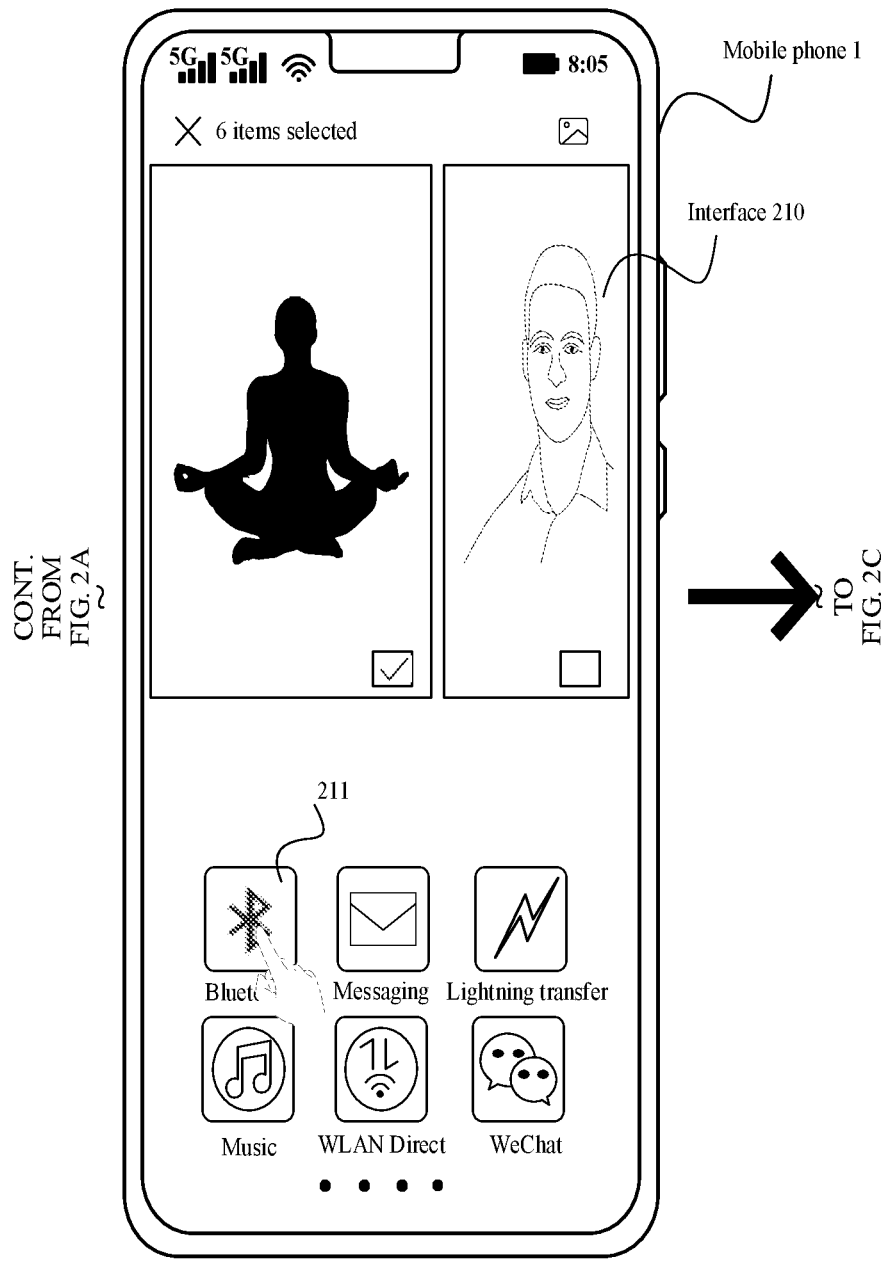
Figure 2C:
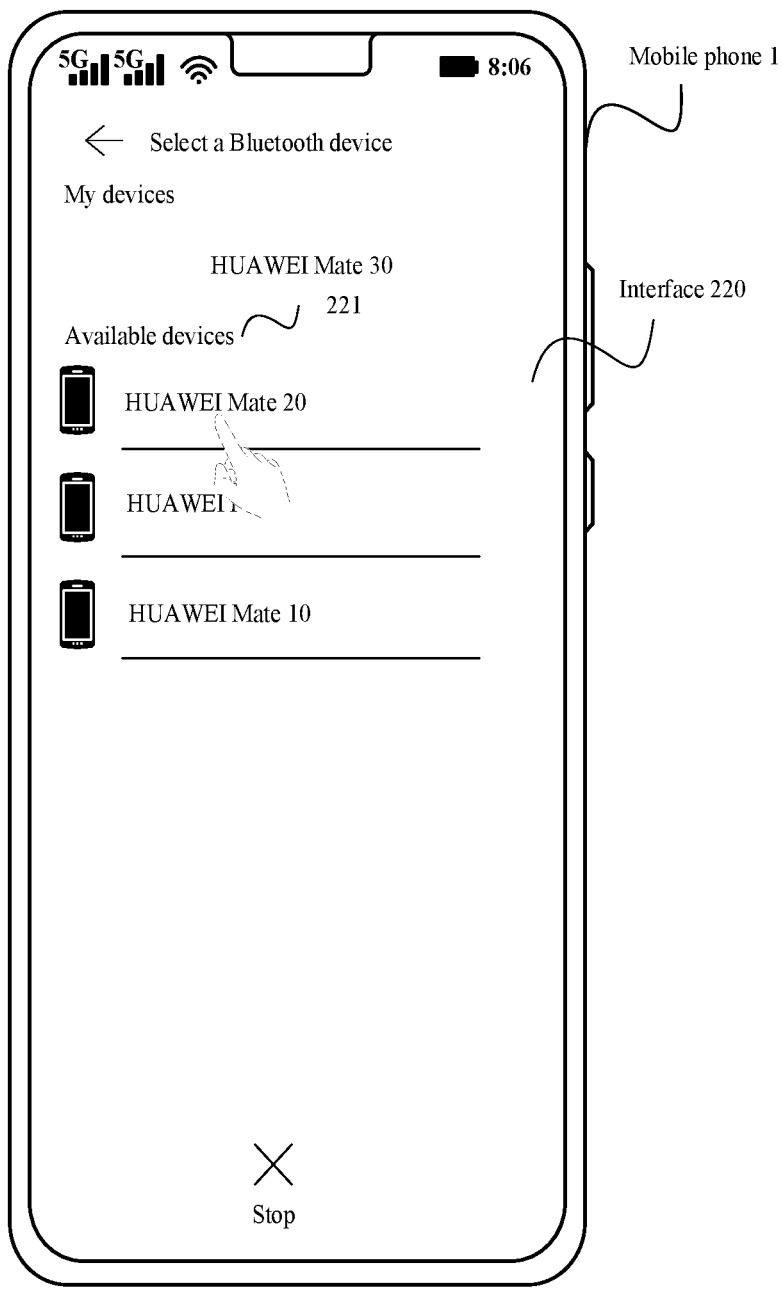
Figure 2D:
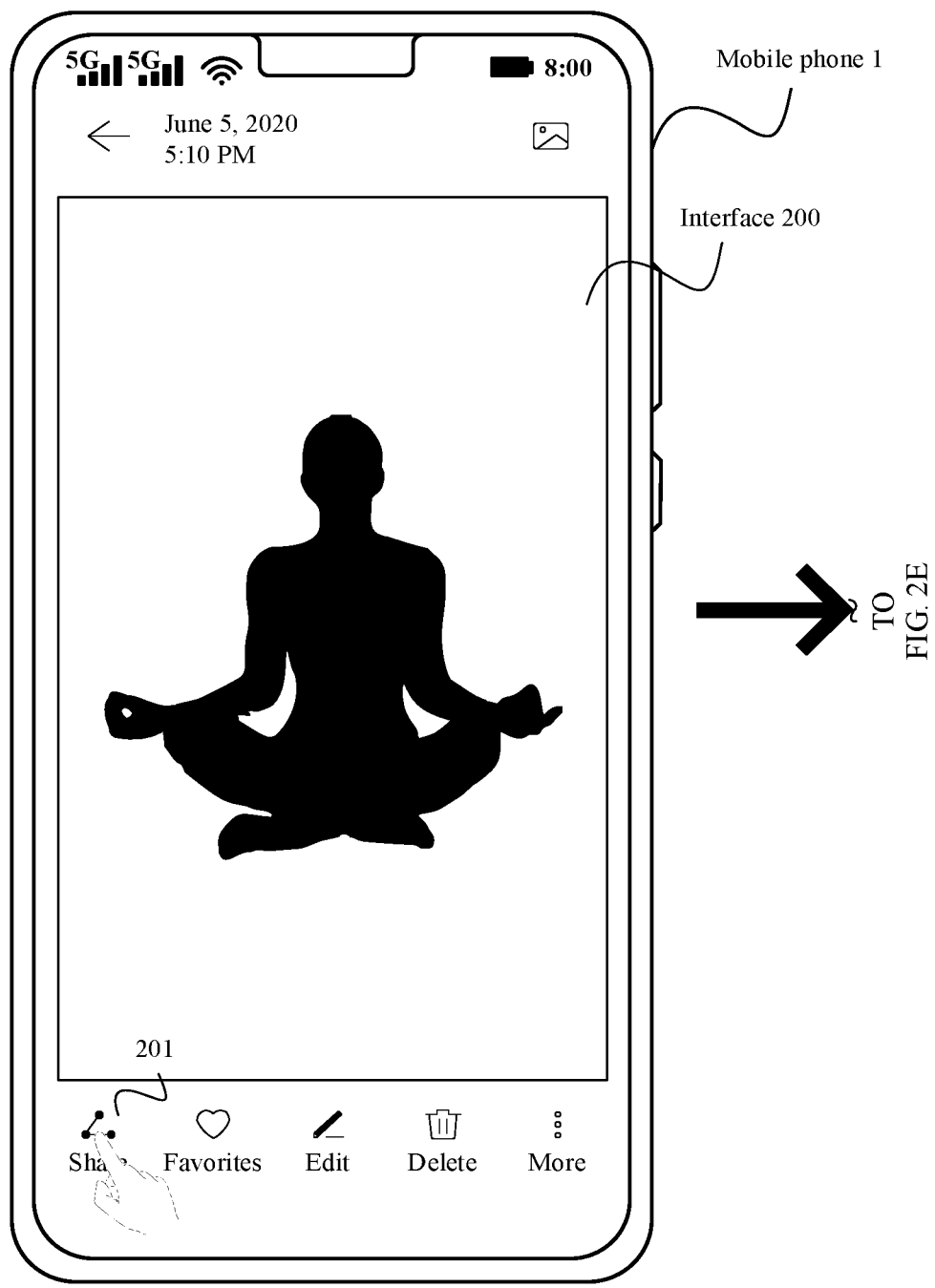
FIG. 2D, FIG. 2E, FIG. 2F, and FIG. 2G are schematic diagrams of interfaces for data transmission through WI-FI P2P according to an embodiment of this disclosure.
Figure 2E:
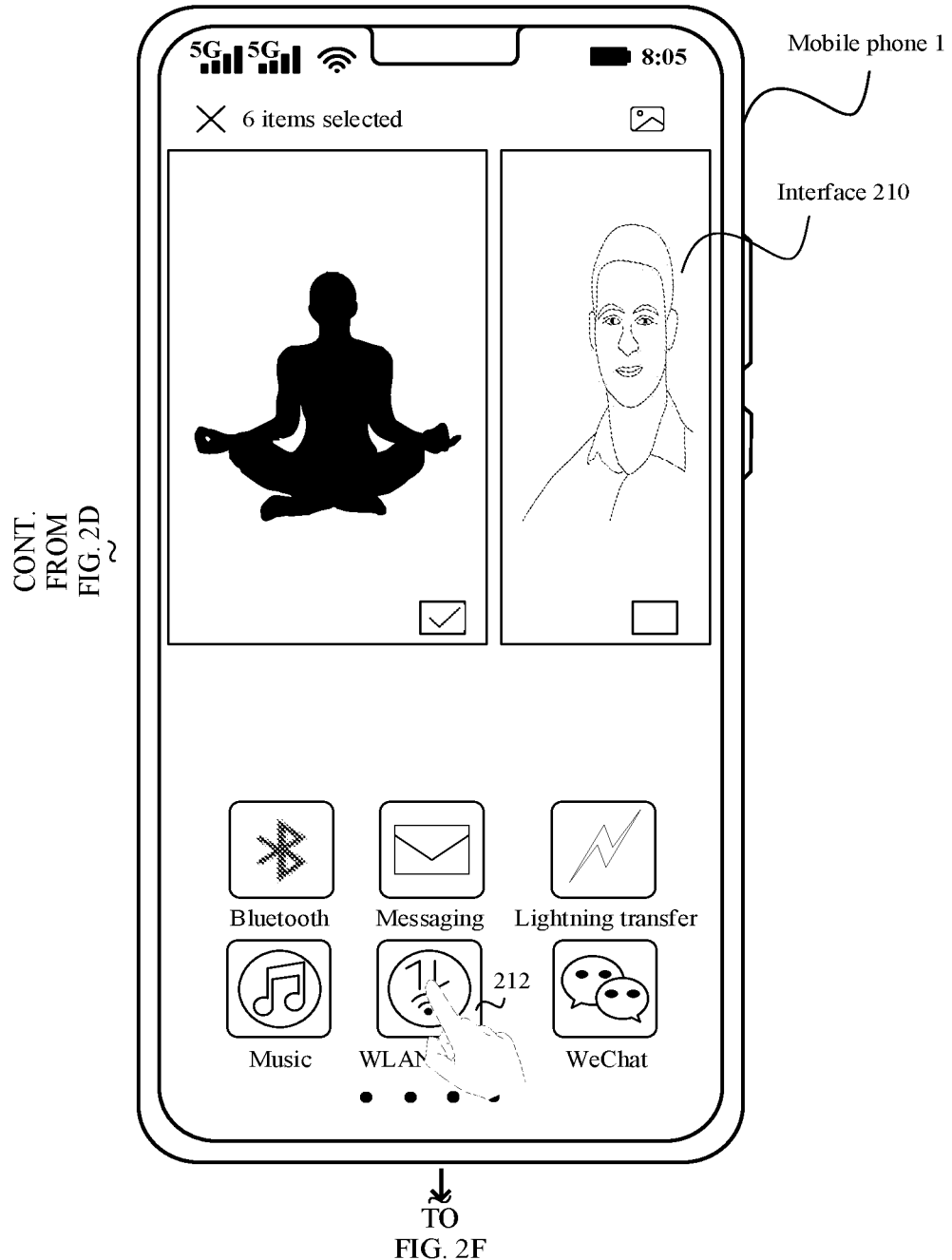
Figure 2F:
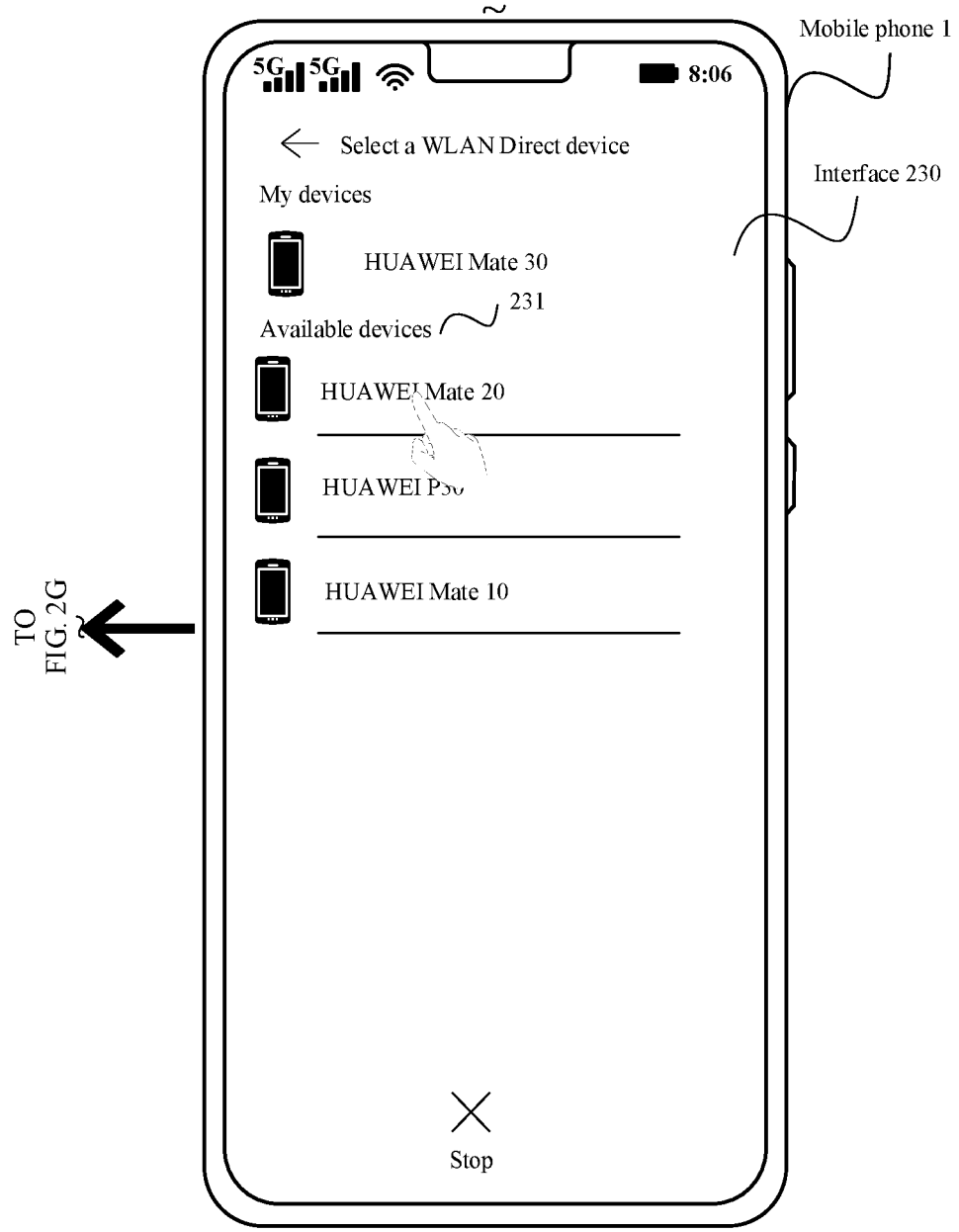
Figure 2G:
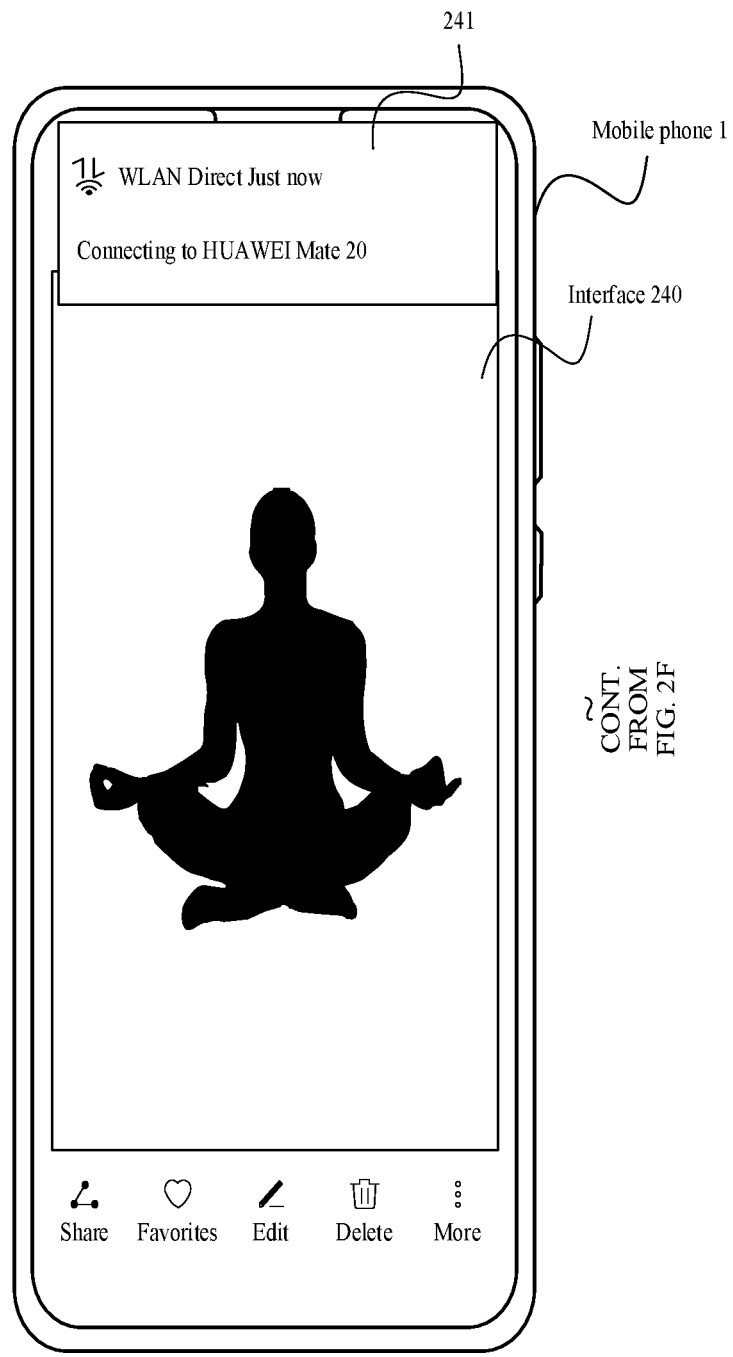

FIG. 2A, FIG. 2B, and FIG. 2C are schematic diagrams of interfaces for data transmission through BLUETOOTH. The mobile phone 1 may display, in response to a first operation of a user (for example, a tap operation on the photo in the gallery), a user interface 200 on a display. Then, the user taps a "share" button 201 on the user interface 200. In response to the tap operation of the user, the mobile phone 1 displays a user interface 210 on the display. The user interface 210 may include options of a plurality of sharing manners, for example, a "BLUETOOTH" button 211. In this case, the user taps the "BLUETOOTH" button 211, and in response to the tap operation performed by the user on the "BLUETOOTH" button, the mobile phone 1 displays a BLUETOOTH device selection interface 220 on the display. On the user interface 220, an available device list 221 (where the available device list may also be referred to as a discovered device list) is displayed. The list may include identifiers of one or more devices. All devices in the list support BLUETOOTH transmission, enable a BLUETOOTH transmission manner, and may send broadcast messages based on a BLUETOOTH communications protocol, so that the mobile phone 1 can receive the broadcast messages sent by these devices. In this way, the mobile phone 1 can discover these devices. The broadcast messages sent by these devices may carry respective identifiers (such as a device model, for example, HUAWEI Mate 20), and the mobile phone 1 may display, in the available device list, the device identifiers carried in the received broadcast messages. The user may tap an identifier of the mobile phone 2, for example, HUAWEI Mate 20, in the available device list 221, and then the mobile phone 1 transmits a selected picture to the mobile phone 2 in the BLUETOOTH transmission manner.

It should be noted that the mobile phone 2 may be a device that has performed BLUETOOTH pairing with the mobile phone 1, or may be a device that has not performed BLUETOOTH pairing with the mobile phone 1. This is not limited in this disclosure.

FIG. 2D, FIG. 2E, FIG. 2F, and FIG. 2G are schematic diagrams of interfaces for data transmission through WI-FI P2P. Photo sharing is still used as an example. In another scenario, a user taps a "WLAN Direct" button 212 on an interface 210, and in response to the tap operation performed by the user on the "WLAN Direct" button, the mobile phone 1 displays a user interface 230 on a display. The user interface 230 includes an available device list 231 (where the available device list may also be referred to as a discovered device list). The list may include identifiers of one or more devices. All devices in the list support WI-FI P2P transmission, a WI-FI P2P switch is turned on, and all devices may send broadcast messages based on a related communications protocol, so that the mobile phone 1 can receive the broadcast messages sent by these devices. In this way, the mobile phone 1 can discover these devices. The user taps an identifier of the mobile phone 2, for example, HUAWEI Mate 20, in the available device 231, and then the mobile phone 1 establishes a WI-FI P2P connection to the mobile phone 2, and displays a user interface 240 on the display. A prompt box 241 is displayed on the user interface 240, and content of the prompt box 241 is "connecting to HUAWEI Mate 20". After the connection is completed, a selected picture may be transmitted to the mobile phone 2 in a WI-FI P2P transmission manner.

It should be noted that relatively few devices support WI-FI P2P, and even many users do not know whether their devices support WI-FI P2P transmission. Therefore, this function is not used. In other words, user usage of this transmission manner is relatively low.

That is, in the current data transmission manners, although relatively more devices support BLUETOOTH, a BLUETOOTH transmission speed is relatively slow, and although a WI-FI P2P transmission speed is fast, usage is relatively low. Therefore, how to perform data transmission conveniently and quickly is a problem to be resolved.

In view of this, embodiments of this disclosure provide a data transmission method. In the method, advantages of BLUETOOTH transmission and WI-FI P2P transmission are combined. When data is transmitted through BLUETOOTH, if all electronic devices that perform data transmission support WI-FI P2P transmission, BLUETOOTH transmission is switched to WI-FI P2P transmission, to quickly complete data transmission and improve data transmission efficiency.

In addition, in embodiments of this disclosure, "at least one" means one or more, and "a plurality of" means two or more. Furthermore, it should be understood that in description of this disclosure, terms such as "first" and "second" are merely used for distinguishing and description, but should not be understood as indicating or implying relative importance, or should not be understood as indicating or implying a sequence.

Terms used in the following embodiments are merely intended to describe specific embodiments, but are not intended to limit this disclosure. The terms "one", "a" and "this" of singular forms used in this specification and the appended claims of this disclosure are also intended to include expressions such as "one or more", unless otherwise specified in the context clearly. It should be further understood that, in embodiments of this disclosure, "one or more" refers to one, two, or more, and the term "and/or" describes an association between associated objects, and indicates that three relationships may exist. For example, A and/or B may indicate the following cases: only A exists, both A and B exist, and only B exists, where A and B may be singular or plural. The character "/" usually indicates an "or" relationship between the associated objects.

Reference to "an embodiment", "some embodiments", or the like described in this specification indicates that one or more embodiments of this disclosure include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise emphasized in another manner. The terms "include", "have", and their variants all mean "include but are not limited to", unless otherwise emphasized in another manner.

The following describes in detail the data transmission method in embodiments of this disclosure by using an example in which data transmission is performed between two electronic devices. It may be understood that for a method for performing data transmission between three or more electronic devices, refer to a method for performing data transmission between two electronic devices. The method for performing data transmission between three or more electronic devices is not described in this disclosure.

It should be noted that the data transmission method in embodiments of this disclosure may be applied to a scenario of communications between electronic devices based on a short-distance communications network. For example, the communications network may be a short-distance communications network such as a WI-FI hotspot network, a WI-FI P2P network, a BLUETOOTH network, a ZIGBEE network, or an NFC network.

For ease of description, two electronic devices to perform data transmission are respectively denoted as a "device A" and a "device B". The "device A" is an electronic device at a transmit end, the "device B" is an electronic device at a receive end, a user using the device A is denoted as a "user A", and a user using the device B is denoted as a "user B".

Figure 3:
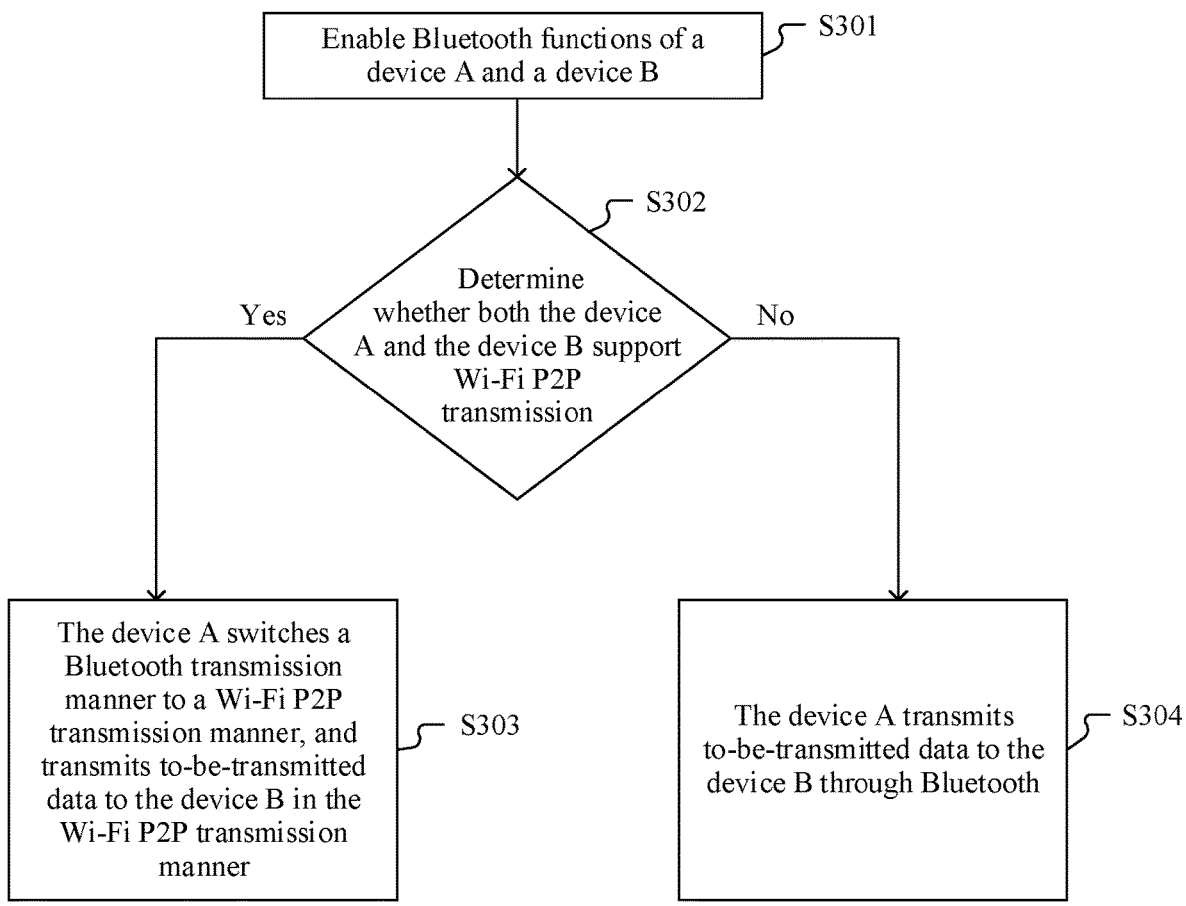
FIG. 3 is a flowchart of a data transmission method according to an embodiment of this disclosure.

FIG. 3 is a flowchart of a data transmission method according to an embodiment of this disclosure. Refer to FIG. 3. The method may include the following steps.

S301: Enable BLUETOOTH functions of the device A and the device B.

Figure 4:
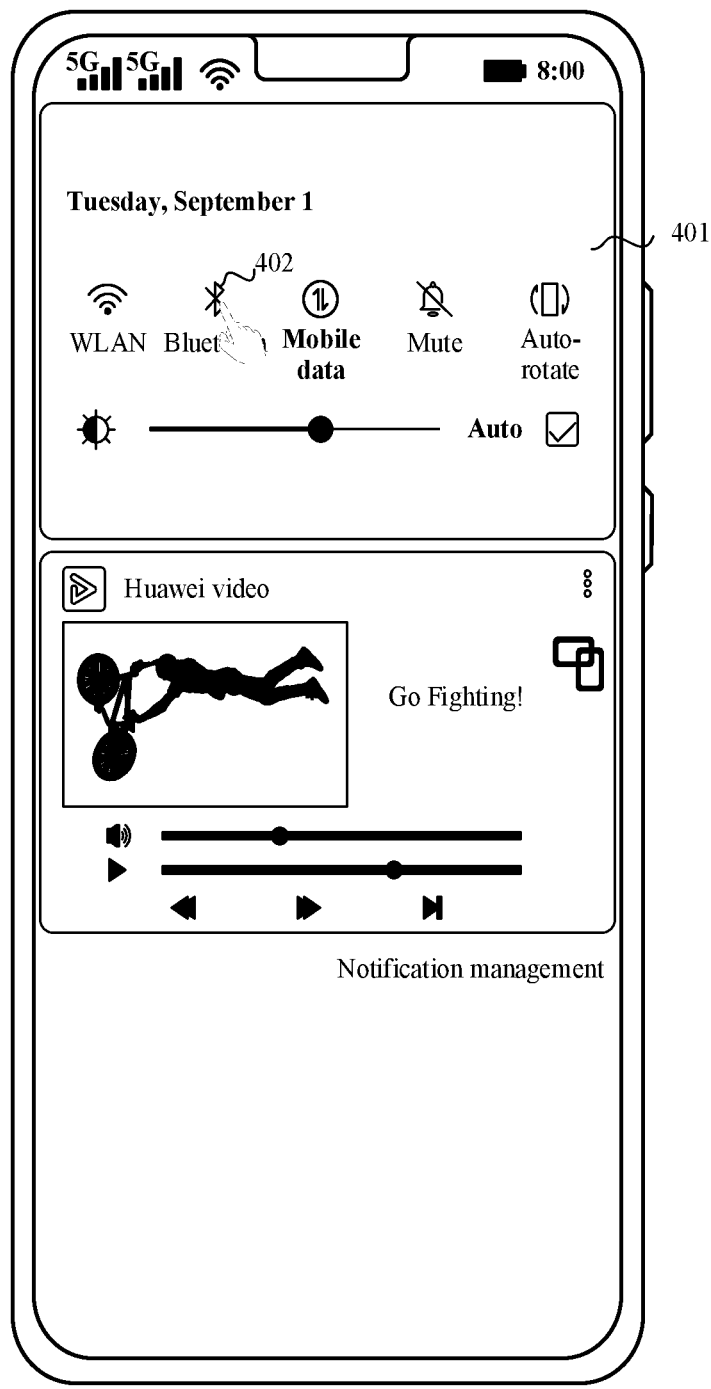
FIG. 4 to FIG. 6 are schematic diagrams of user interfaces according to an embodiment of this disclosure.

For example, refer to FIG. 4. A user slides from top to bottom on a display, an electronic device may display a notification bar 401 in response to the slide operation of the user, and then the user taps a BLUETOOTH icon 402 in the notification bar 401 to enable a BLUETOOTH transmission manner. Certainly, it may be understood that there are many methods for enabling the BLUETOOTH transmission manner. For example, the user may alternatively enable the BLUETOOTH transmission manner by using a voice instruction (for example, a voice of "enable BLUETOOTH"), or may alternatively enable the BLUETOOTH transmission manner by using a shortcut gesture operation (for example, swiping up with three fingers). This is not limited in this disclosure.

S302: Determine whether both the device A and the device B support WI-FI P2P transmission.

In this embodiment of this disclosure, the electronic device may determine, by detecting whether a WI-FI P2P process or a WI-FI P2P service exists in the electronic device, whether the electronic device supports WI-FI P2P transmission. For example, if the electronic device detects that the WI-FI P2P process exists in the electronic device, the electronic device may determine that the electronic device supports WI-FI P2P transmission. If the electronic device detects that no WI-FI P2P process exists in the electronic device, the electronic device may determine that the electronic device does not support WI-FI P2P transmission.

S303: If both the device A and the device B support WI-FI P2P transmission, the device A switches a BLUETOOTH transmission manner to a WI-FI P2P transmission manner, and transmits to-be-transmitted data to the device B in the WI-FI P2P transmission manner.

After the BLUETOOTH transmission manner is enabled, the electronic device may broadcast an identifier of the electronic device to surrounding electronic devices, so that the identifier may be discovered by another electronic device. For example, if the BLUETOOTH transmission manner is enabled on a mobile phone A, the mobile phone A may send a broadcast message. The broadcast message may carry a device identifier of the mobile phone A, media access control (MAC) address information, Extended Inquiry Response (EIR) data, and the like. In this way, after the BLUETOOTH transmission manner is enabled on another electronic device in a coverage area of a BLUETOOTH signal, the mobile phone A can be found, and the mobile phone A is added to an available device list.

In some embodiments, the electronic device may add, to the broadcast message, an identifier (or referred to as indication information) used to indicate whether the electronic device supports WI-FI P2P transmission. For example, a flag bit of one or more bits may be added to the broadcast message, and different values of the flag bit are used to indicate whether the electronic device that sends the broadcast message supports WI-FI P2P transmission. For example, when a value of the flag bit carried in the broadcast message is equal to 1, it indicates that the electronic device supports WI-FI P2P transmission, or when a value of the flag bit carried in the broadcast message is equal to 0, it indicates that the electronic device does not support WI-FI P2P transmission, and vice versa. To be specific, when a value of the flag bit carried in the broadcast message is equal to 0, it indicates that the electronic device supports WI-FI P2P transmission, or when a value of the flag bit carried in the broadcast message is equal to 1, it indicates that the electronic device does not support WI-FI P2P transmission. Certainly, it may be understood that the identifier used to indicate whether the electronic device supports WI-FI P2P transmission may alternatively be in another form. This is not limited in this disclosure. In an example, the identifier may be carried in the EIR data as an extension field, and whether WI-FI P2P transmission is supported may be determined based on a value of the extension field. For example, when the value of the extension field is 1, it indicates that WI-FI P2P transmission is supported, or when the value of the extended field is 0, it indicates that WI-FI P2P transmission is not supported.

In some other embodiments, if the electronic device supports WI-FI P2P transmission, indication information is carried in the broadcast message, and the indication information is used to indicate that the electronic device supports WI-FI P2P transmission. If the electronic device does not support WI-FI P2P transmission, the indication information is not carried in the broadcast message.

S304: If at least one of the device A and the device B does not support WI-FI P2P transmission, the device A transmits to-be-transmitted data to the device B through BLUETOOTH.

In this embodiment of this disclosure, if the mobile phone A and/or a mobile phone B do not support WI-FI P2P transmission, the mobile phone A may transmit to-be-transmitted data to the mobile phone B in the BLUETOOTH transmission manner. For example, on a user interface 900 shown in FIG. 9A and FIG. 9B, if the user selects a HUAWEI Mate 10 902 in an available device list 901, that is, the device is selected as a target device (namely, the mobile phone B), because the mobile phone B is displayed as "WI-FI transmission is not supported", indicating that the mobile phone B does not support WI-FI P2P transmission, the mobile phone A sends the to-be-transmitted data to the mobile phone B in the BLUETOOTH transmission manner.

Figure 9A:
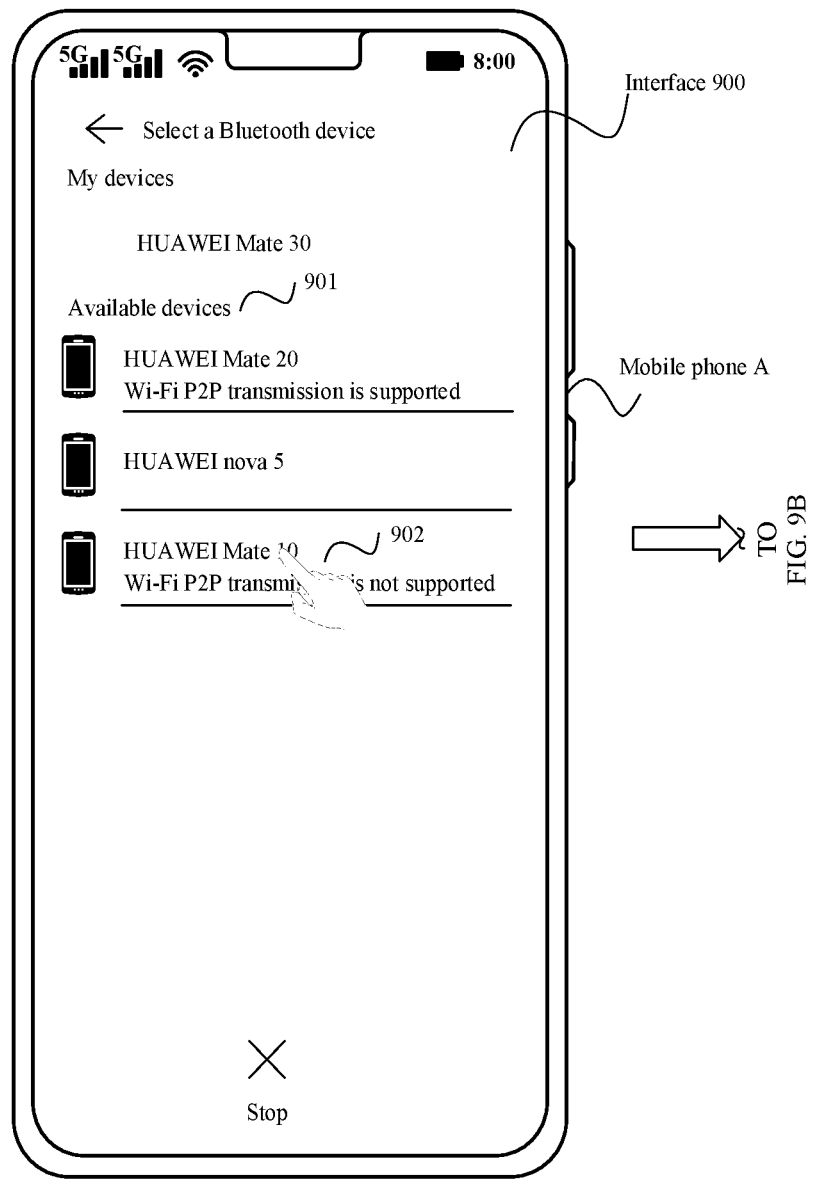
Figure 9B:
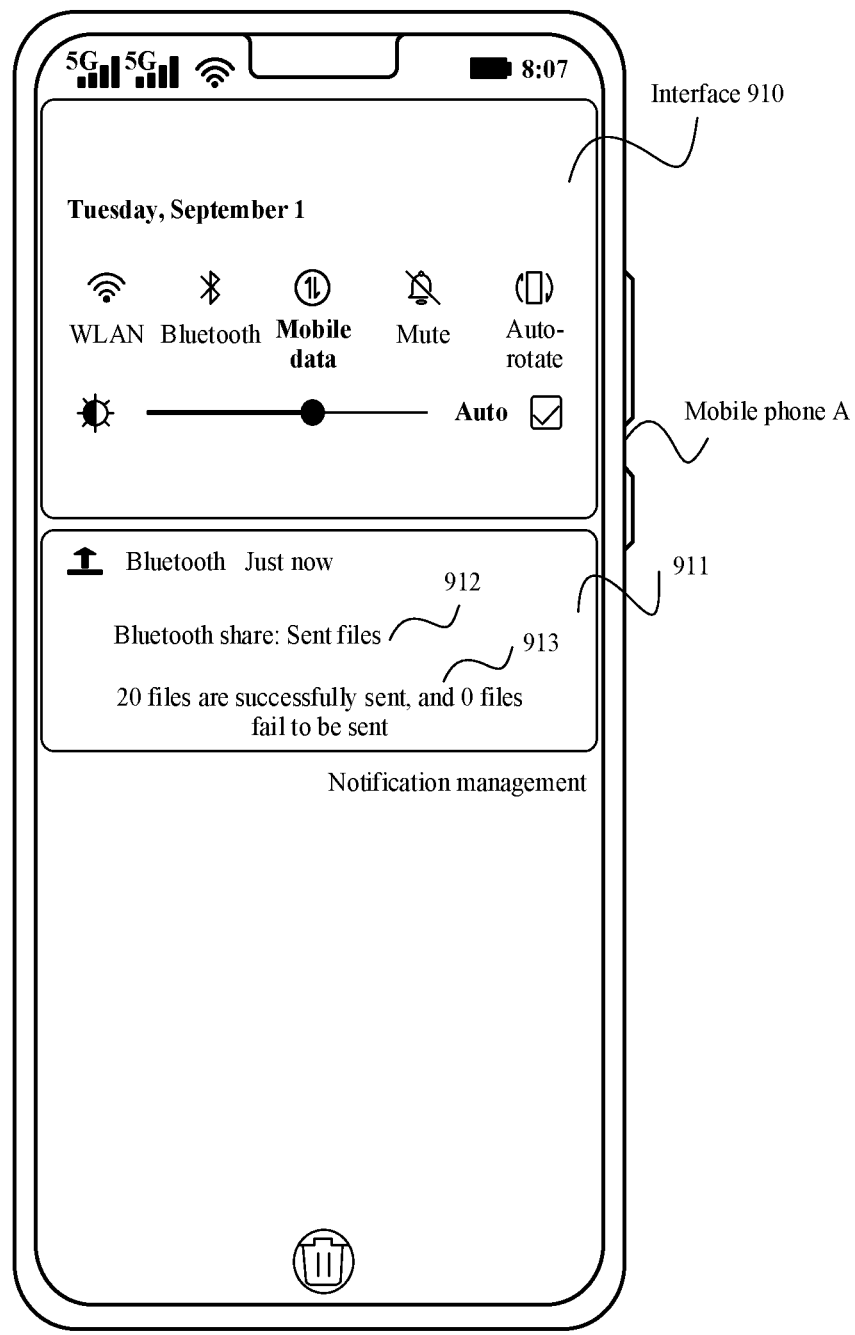

Based on FIG. 9A and FIG. 9B, if the user selects an identifier HUAWEI Mate 10 as a receive end device, the user A may tap the identifier "HUAWEI Mate 10" 902. In response to the tap operation performed by the user on the "HUAWEI Mate 10" 902, the mobile phone A may determine that the receive end does not support WI-FI P2P transmission, and then send the selected to-be-transmitted data to the mobile phone B in the BLUETOOTH transmission manner. In a transmission process, the user may view a transmission progress by pulling down a notification bar. For example, after transmission is completed, for a display interface of the notification bar, refer to a user interface 910. The user interface 910 may include a notification 911. For example, the notification 911 may include a transmission manner "BLUETOOTH share: Sent files" 912 and a transmission status "20 files are successfully sent, and 0 files fail to be sent" 913.

The following describes S303 in FIG. 3 in detail with reference to specific scenarios.

Scenario 1: Both an electronic device A and an electronic device B support WI-FI P2P transmission, and a WI-FI P2P transmission manner is also enabled.

It is assumed that photos (such as 20 photos) in the mobile phone A are shared with the mobile phone B. Refer to FIG. 5A, FIG. 5B, FIG. 5C, FIG. 5D, FIG. 5E, and FIG. 5F. The user A may tap a "share" button 501 on a user interface 500. In response to the tap operation performed by the user on the "share" button 501, the mobile phone A may display a user interface 510 on a display. The user interface 510 may include options of a plurality of sharing manners, for example, a "BLUETOOTH" button 511, a "messaging" button 512, and a "WLAN Direct" button 513. In this case, the user may tap the "BLUETOOTH" button 511, and in response to the tap operation performed by the user on the "BLUETOOTH" button 511, the mobile phone A may display a BLUETOOTH device selection interface 520 on the display. The user interface 520 may display an available device list 521. The list may include identifiers of one or more devices. All devices in the list support BLUETOOTH transmission, and the BLUETOOTH transmission manner is enabled, so that the mobile phone A can discover these devices and add these devices to the available device list 521.

If a device in the available device list 521 supports WI-FI P2P transmission, the device may be marked as supporting WI-FI P2P transmission in the available device list 521. For example, in a marking method, "WI-FI P2P transmission is supported" may be displayed under an identifier of the device, as shown in the figure. If a device in the available device list does not support WI-FI P2P transmission, the device may be marked as not supporting WI-FI P2P transmission in the available device list 521. For example, in a marking method, "WI-FI P2P transmission is not supported" may be displayed under an identifier of the device, as shown in the figure. Certainly, it may be understood that if the device does not support WI-FI P2P transmission, "WI-FI P2P transmission is not supported" may not be displayed. Certainly, another marking method may alternatively be used. For example, a display color of the identifier of the device in the available device list is distinguished from a display color of an identifier of a device that does not support WI-FI P2P transmission, or a specified pattern is displayed on the right or left of the identifier of the device. This is not limited in this embodiment of this disclosure, provided that the user can distinguish which devices in the available device list support WI-FI P2P transmission and/or which devices do not support WI-FI P2P transmission.

For example, it is assumed that the available device list displayed on the user interface 520 includes a device that supports WI-FI P2P transmission and a device that does not support WI-FI P2P transmission. For example, if a "HUAWEI Mate 20" 522 in the available device list is the device that supports WI-FI P2P transmission, "WI-FI P2P transmission is supported" may be displayed under "HUAWEI Mate 20". For another example, if a "HUAWEI nova 5" 523 in the available device list is the device that does not support WI-FI P2P transmission, "WI-FI P2P transmission is supported" is not displayed under "HUAWEI nova 5".

An example in which the "HUAWEI Mate 20" 522 in the available device list supports WI-FI P2P transmission is used. After the user taps the "HUAWEI Mate 20" 522 in the available device list, the mobile phone A may send, in response to the tap operation of the user, a message to request to establish a WI-FI P2P connection to the mobile phone B, and display a user interface 530 on a display interface of the display. A prompt box 531 may be displayed on the user interface 530. The prompt box may include a text prompt "waiting for reception" 532, "switched to WI-FI P2P transmission" 533, and a button "cancel" 534.

It is assumed that the user B selects, by using the mobile phone B, to accept establishment of the WI-FI P2P connection to the mobile phone A. For example, the user B may tap a "receive" button on the mobile phone B, so that the mobile phone B returns, to the mobile phone A, a response message indicating that the establishment of the WI-FI P2P connection to the mobile phone A is agreed, and then the mobile phone A sends a photo to the mobile phone B by using the WI-FI P2P connection after the WI-FI P2P connection is established. In a photo transmission process, a user interface 540 may be displayed on the display of the mobile phone A, and a prompt box 541 may be displayed on the user interface 540. The prompt box 541 may include a text prompt "send 20 photos to HUAWEI Mate 20" 542 and a transmission progress 543, for example, "completed: 95%". After photo transmission is completed, a user interface 550 may be displayed on the display of the mobile phone A. A prompt box 551 may be displayed on the user interface 550. Content of the prompt box 551 may be a text prompt "20 photos are transmitted successfully, and 0 photos fail" 552.

Figure 5A:
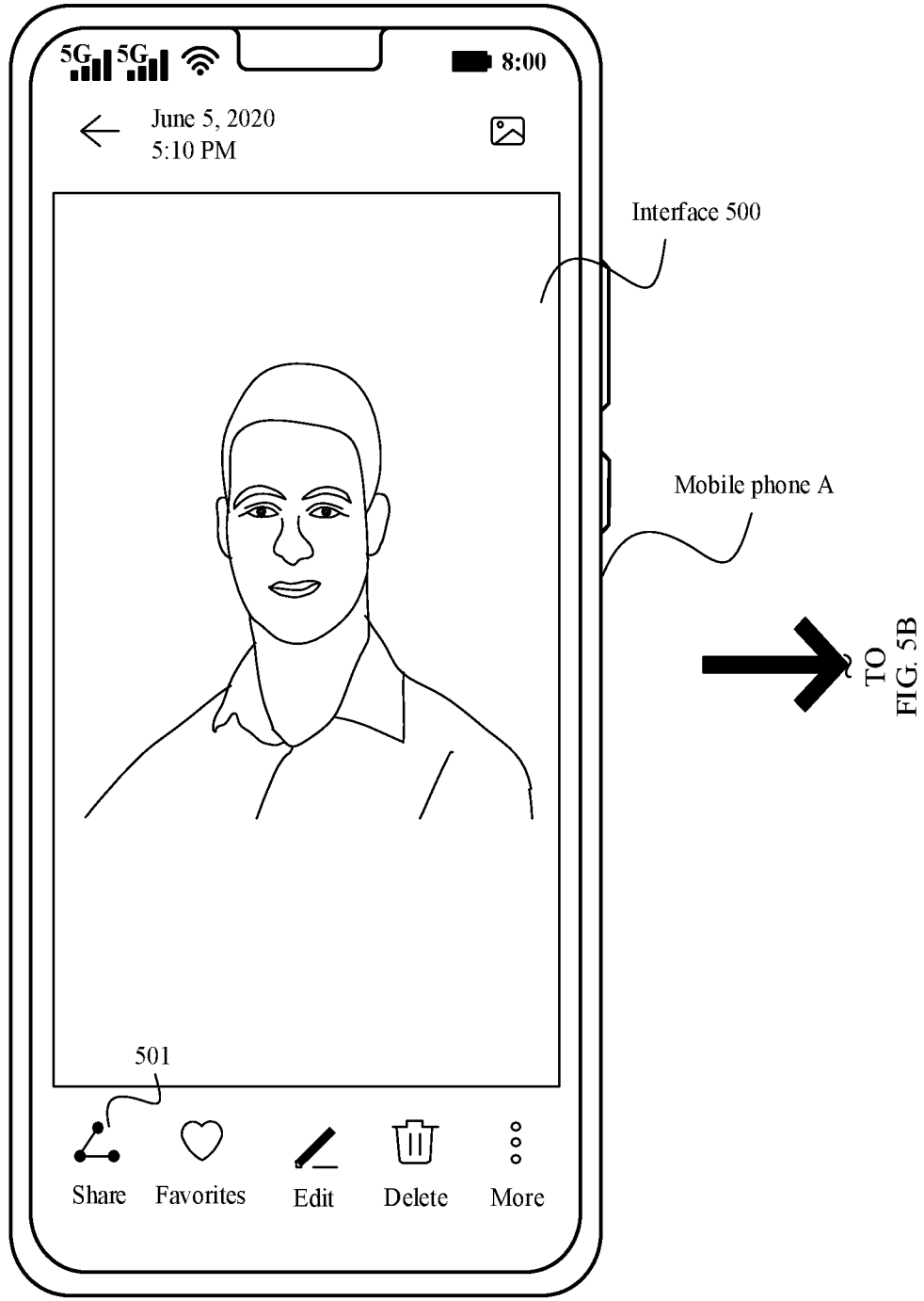
Figure 5B:
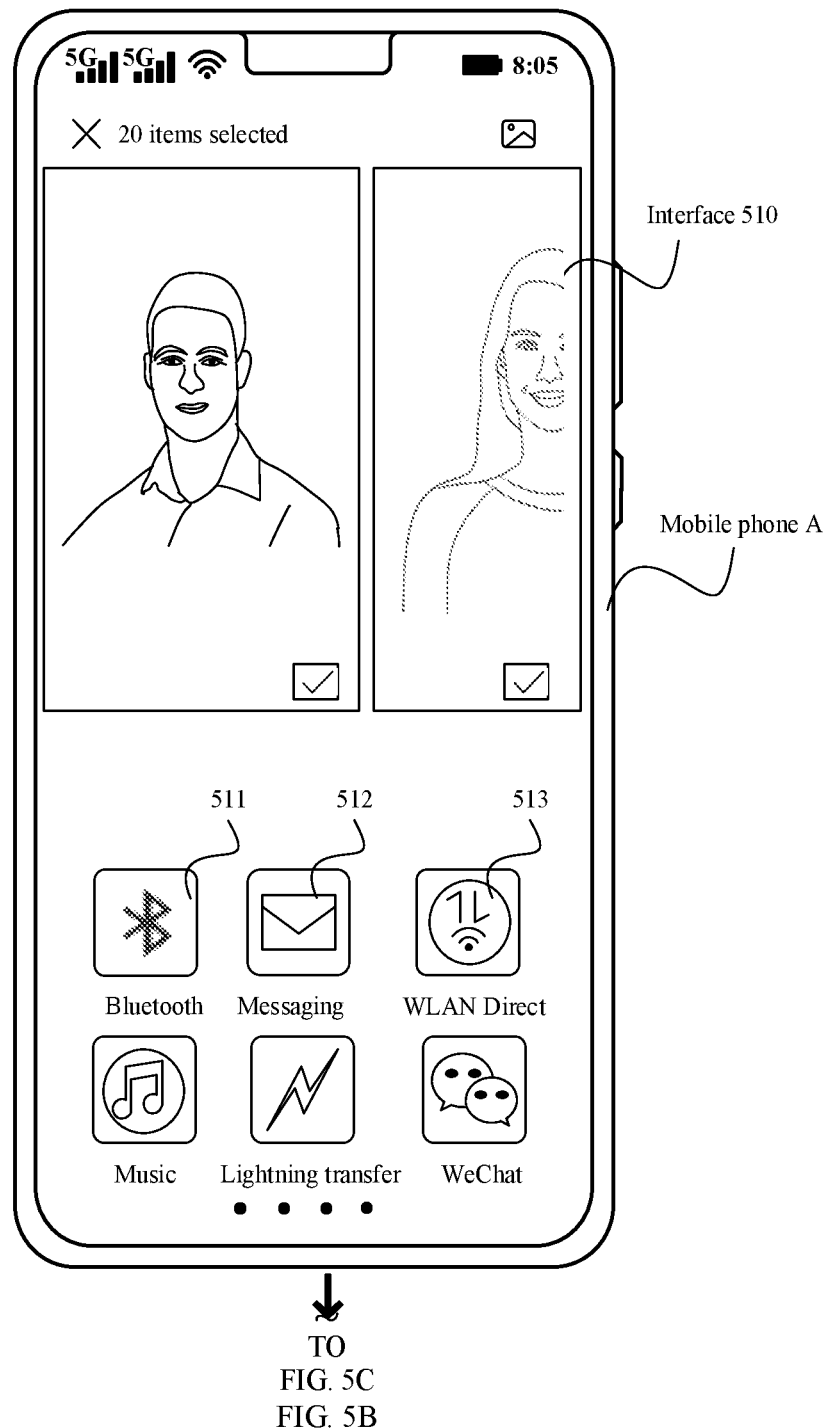
Figure 5C:
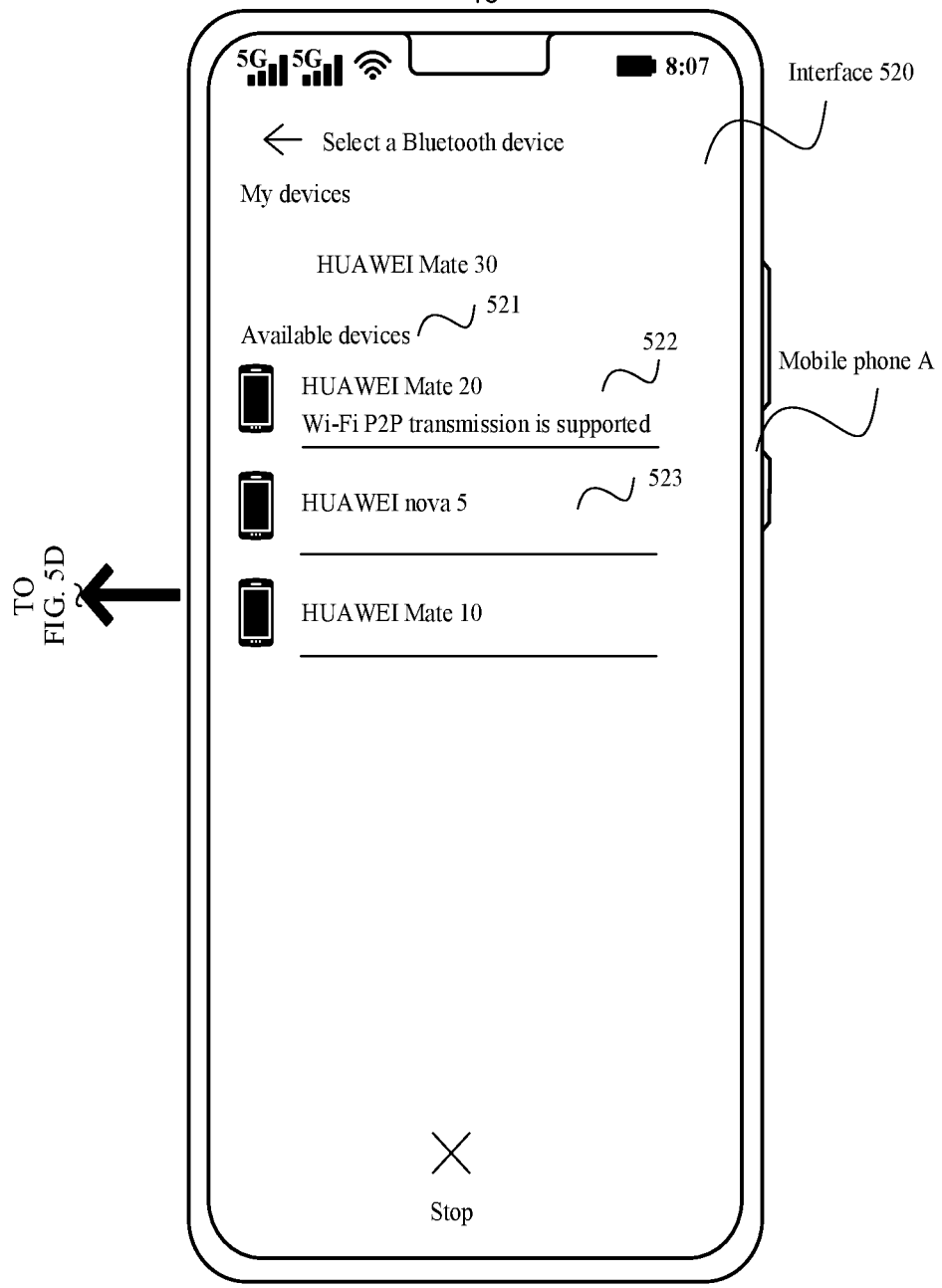
Figure 5D:
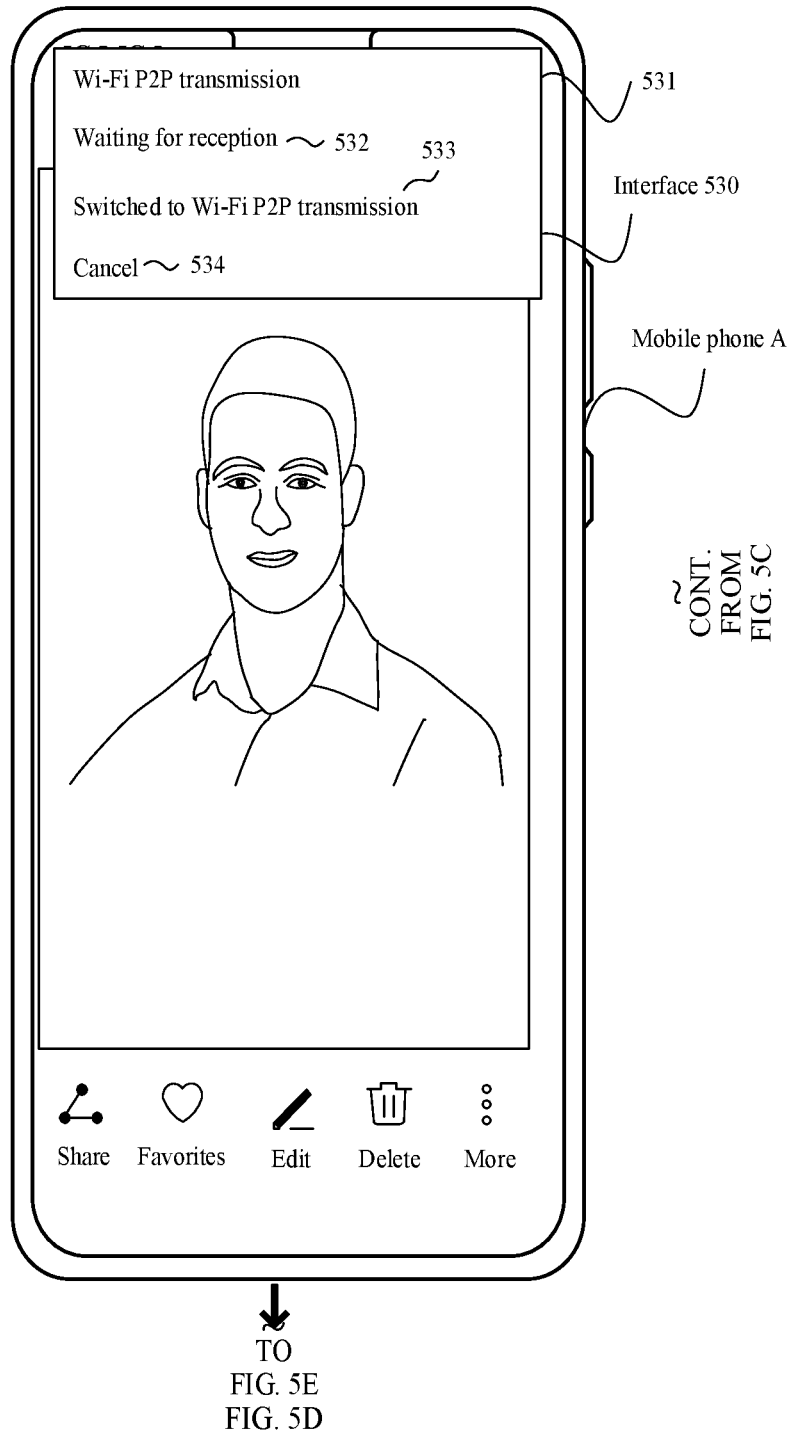
Figure 5E:
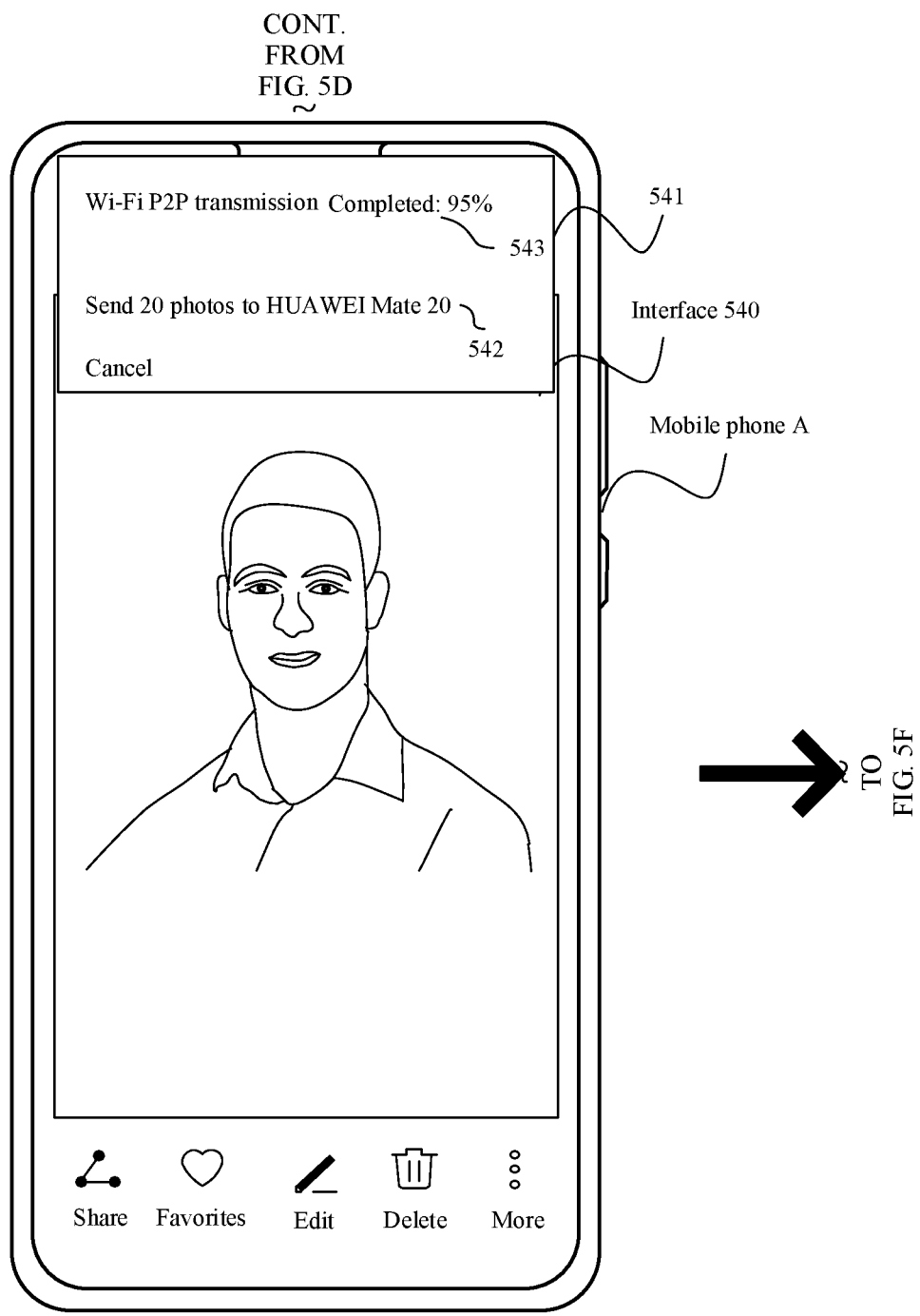
Figure 5F:
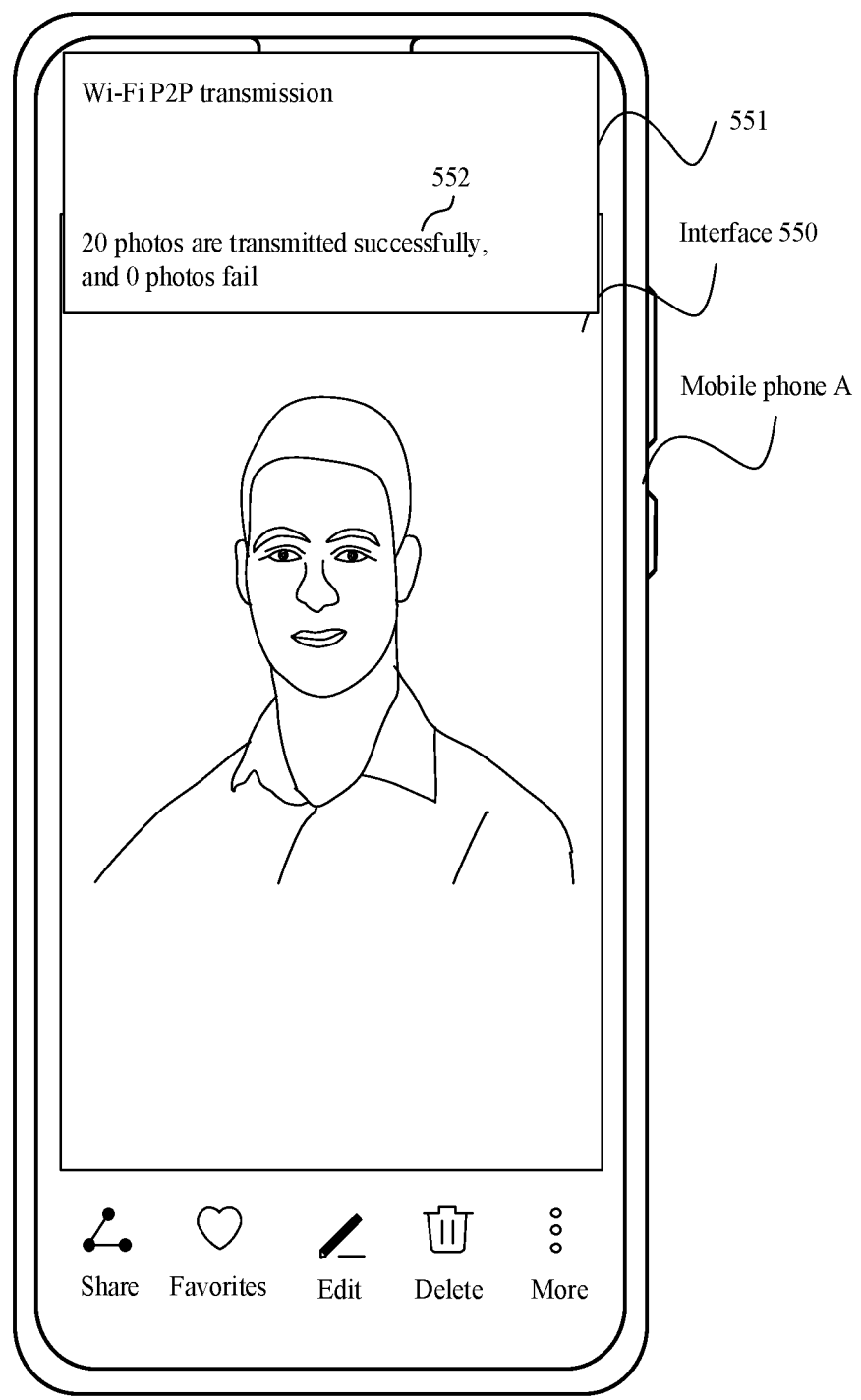

It may be understood that the prompt box 551 on the user interface 550 shown in FIG. 5F may be closed after display duration reaches specified duration. For example, the prompt box 551 may be automatically closed 10 s after being displayed on the user interface 550. Certainly, the prompt box may also be displayed on a notification management interface shown in FIG. 4. This is not limited in this disclosure.

Figure 6:
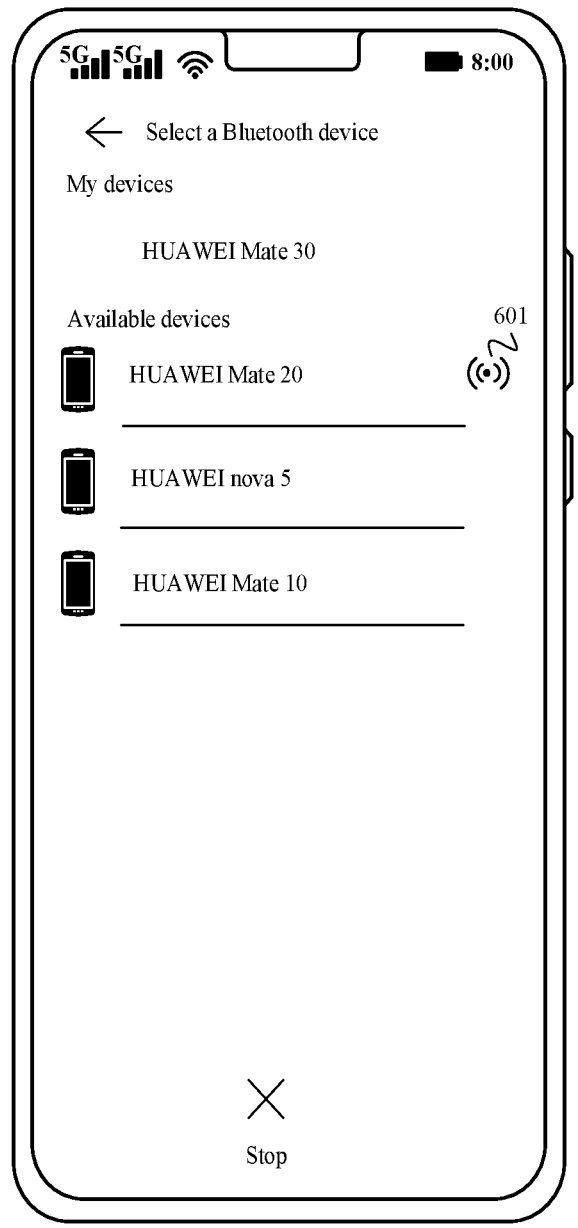

As shown in FIG. 6, in some embodiments, if a device "HUAWEI Mate 20" in available devices displayed on the user interface 520 supports WI-FI P2P transmission, a specified icon may be displayed on the right of an identifier of the device, for example, as shown by an icon 601 in FIG. 6. If the icon 601 is not displayed on the right of an identifier of a device "HUAWEI nova 5" and an identifier of a device "HUAWEI Mate 10" in the list, it indicates that the devices do not support WI-FI P2P transmission. Certainly, the specified icon may alternatively be displayed on the left of the identifier of the device. It should be noted that, in the schematic diagram shown in FIG. 6, a color of the icon 601 may be used to determine whether a WI-FI P2P transmission manner is enabled on a corresponding device. For example, if the color of the icon 601 is blue, it indicates that the WI-FI P2P transmission manner is enabled on the corresponding electronic device "HUAWEI Mate 20"; or if the color of the icon 601 is gray, it indicates that the WI-FI P2P transmission manner is not enabled on the electronic device "HUAWEI Mate 20". Certainly, the icon may alternatively have another color. This is not limited in this disclosure.

It may be understood that icons, texts, and colors, sizes, styles, and the like of the texts displayed on a user interface are merely examples for description. During actual product implementation, other display forms may also be used. This is not limited in this disclosure.

According to the solution in this embodiment of this disclosure, when shared data is transmitted through BLUETOOTH, if all electronic devices that perform data transmission are devices that support WI-FI P2P transmission, BLUETOOTH transmission may be switched to WI-FI P2P transmission, thereby improving data transmission efficiency.

Scenario 2: Both an electronic device A and an electronic device B support WI-FI P2P transmission, but a WI-FI P2P transmission manner is not enabled on one of the electronic devices, or a WI-FI P2P transmission manner is not enabled on the two devices.

Based on the scenario 2, three cases may be included:
(1) Both the electronic device A and the electronic device B support WI-FI P2P transmission, but the WI-FI P2P transmission manner is not enabled on the electronic device A.
(2) Both the electronic device A and the electronic device B support WI-FI P2P transmission, but the WI-FI P2P transmission manner is not enabled on the electronic device B.
(3) Both the electronic device A and the electronic device B support WI-FI P2P transmission, but the WI-FI P2P transmission manner is not enabled on the electronic device A and the electronic device B.

Figure 7A:
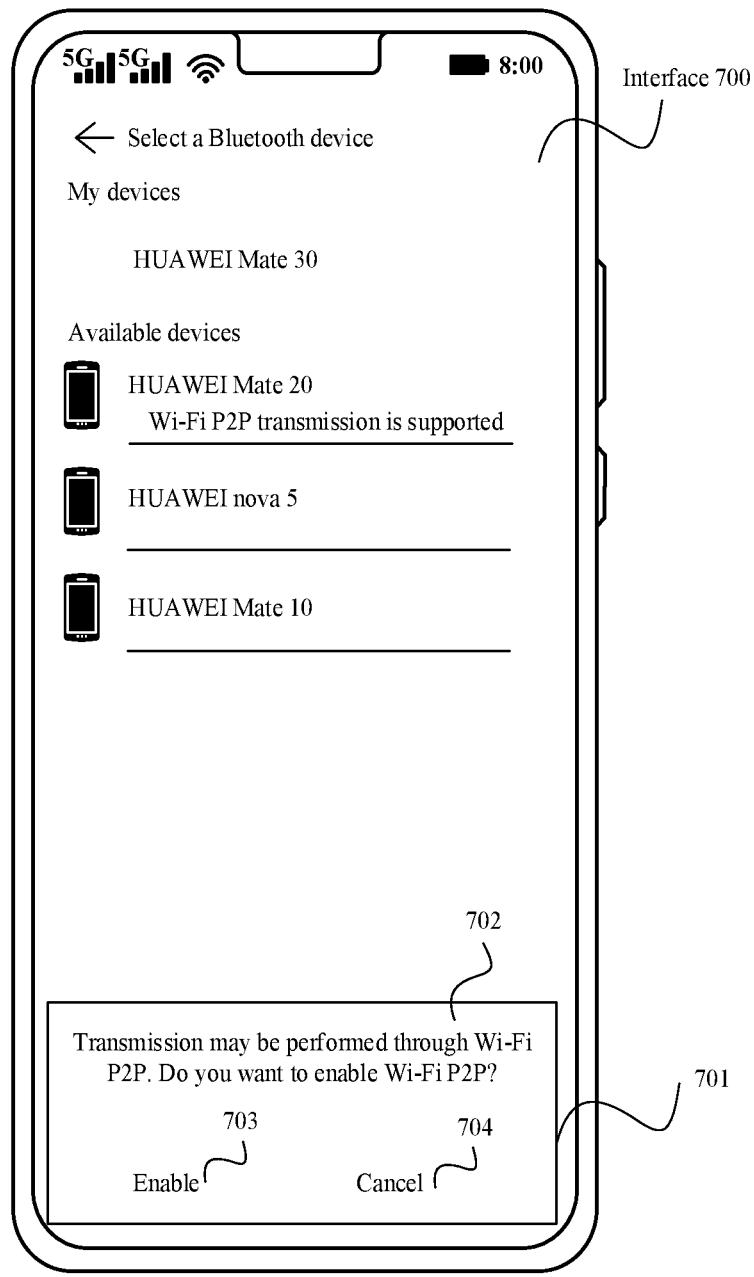
FIG. 7A to FIG. 7C are schematic diagrams of user interfaces according to an embodiment of this disclosure.

For example, if the WI-FI P2P transmission manner is not enabled on the mobile phone A, after the "HUAWEI Mate 20" 522 in the available device list on the user interface 520 of the mobile phone A is tapped, because the currently selected receive end electronic device "HUAWEI Mate 20" supports WI-FI P2P transmission, the mobile phone A determines whether the mobile phone A supports WI-FI P2P transmission. If the mobile phone A supports WI-FI P2P transmission, a user interface 700 shown in FIG. 7A is displayed on the display. In this way, the user can enable the WI-FI P2P transmission manner of the mobile phone A by performing an operation on the user interface 700. The user interface 700 may include a prompt box 701, and the prompt box 701 may include a text prompt "transmission may be performed through WI-FI P2P. Do you want to enable WI-FI P2P?" 702, an "enable" button 703, and a "cancel" button 704. After the user taps the "enable" button 703, the WI-FI P2P transmission manner of the mobile phone A is enabled. Certainly, the user interface 700 is merely an example, and a person skilled in the art may further design another user interface, provided that the user can conveniently enable the WI-FI P2P transmission manner of the mobile phone A by using the interface.

In a possible implementation, after the WI-FI P2P transmission manner of the mobile phone A is enabled, the user may tap the identifier "HUAWEI Mate 20" of the device 522 in the available device list again, and then transmit, to the mobile phone B, a photo that needs to be transmitted.

In another possible implementation, after the WI-FI P2P transmission manner of the mobile phone A is enabled, the mobile phone A may transmit, to the mobile phone B after specified duration (for example, 5 seconds (s)), a photo that needs to be transmitted.

Figure 7B:
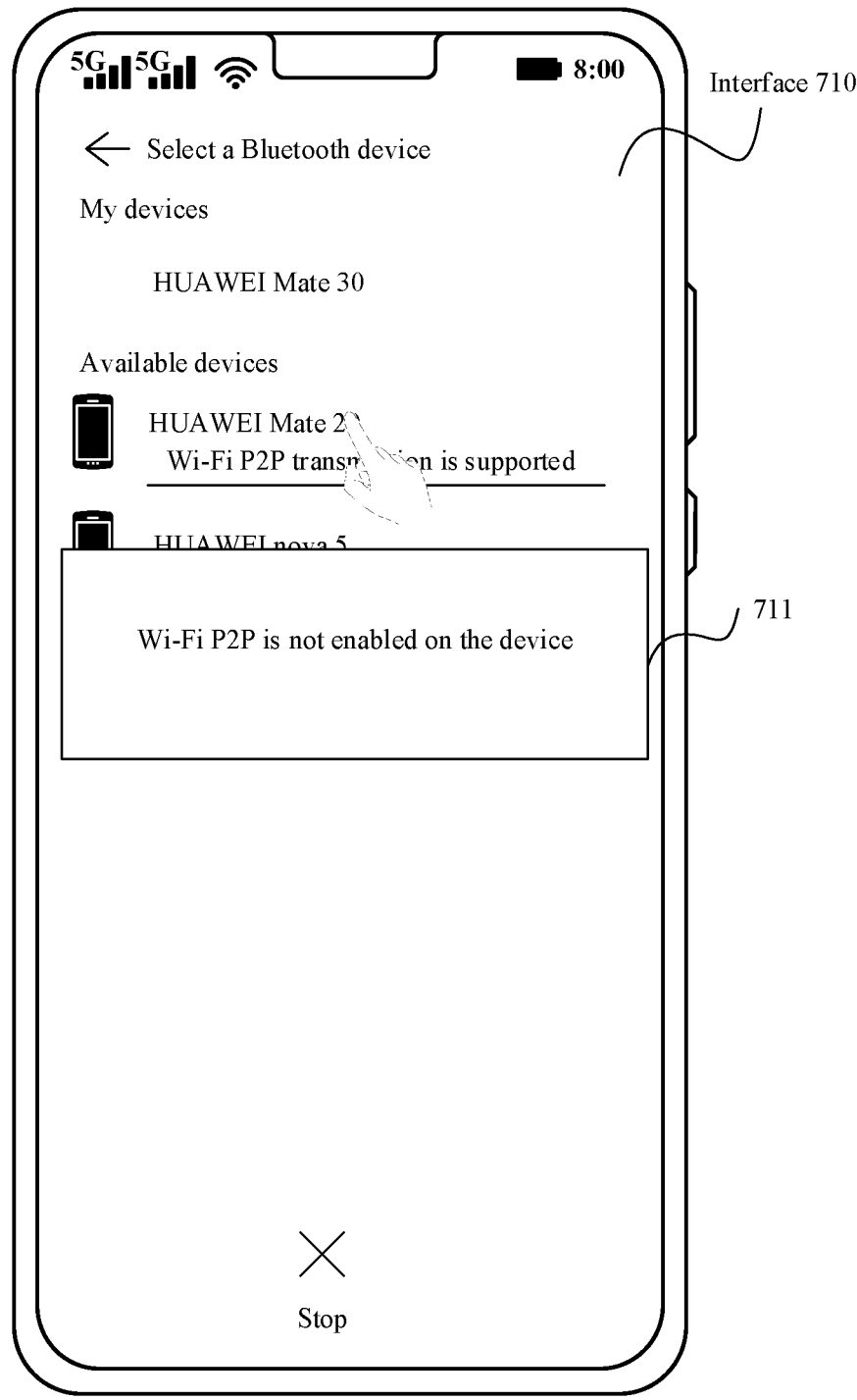

If the WI-FI P2P transmission manner is not enabled on the mobile phone B, after the "HUAWEI Mate 20" 522 in the available device list on the user interface 520 of the mobile phone A is tapped, the mobile phone A determines that the mobile phone B supports WI-FI P2P transmission but does not enable this function. In this case, a user interface 710 shown in FIG. 7B may be displayed on the display. The user interface 710 may include a prompt box 711, and the prompt box 711 is used to prompt the user A that the WI-FI P2P transmission manner is not enabled on the mobile phone B. For example, the prompt box 711 may display the following content "WI-FI P2P is not enabled on the device". Certainly, it may be understood that content displayed in the prompt box 711 may alternatively be "WI-FI P2P is not enabled on HUAWEI Mate 20", or may be "please confirm whether WI-FI P2P is enabled on HUAWEI Mate 20", or the like. This is not limited in this disclosure.

When receiving a broadcast message sent by the mobile phone B, the mobile phone A may determine, based on EIR data carried in the broadcast message of the mobile phone B, whether the WI-FI P2P transmission manner is enabled on the mobile phone B. For example, an extension field may be added to the EIR data, and a value of the extension field is used to determine whether a switch of the WI-FI P2P transmission manner is turned on. For example, when the value of the extension field is 0, it indicates that the switch of the WI-FI P2P transmission manner is not turned on; or when the value of the extension field is 1, it indicates that the switch of the WI-FI P2P transmission manner is turned on.

In a possible implementation, the WI-FI P2P transmission manner may be enabled by using a switch in a drop-down notification bar. For example, refer to FIG. 7C. A user slides from top to bottom of a display, an electronic device may display a notification bar 721 in response to a slide operation of the user, and the user taps a "WI-FI P2P" icon 722 in the notification bar 721 to turn on a WI-FI P2P switch, that is, a WI-FI P2P transmission manner is enabled. Certainly, it may be understood that the WI-FI P2P switch may alternatively be turned on in another manner. For example, the user may alternatively turn on the WI-FI P2P switch by using a voice instruction (for example, a voice of "enable WI-FI P2P") or by using a shortcut gesture operation (for example, swiping down with three fingers). This is not limited in this disclosure.

Figure 7C:
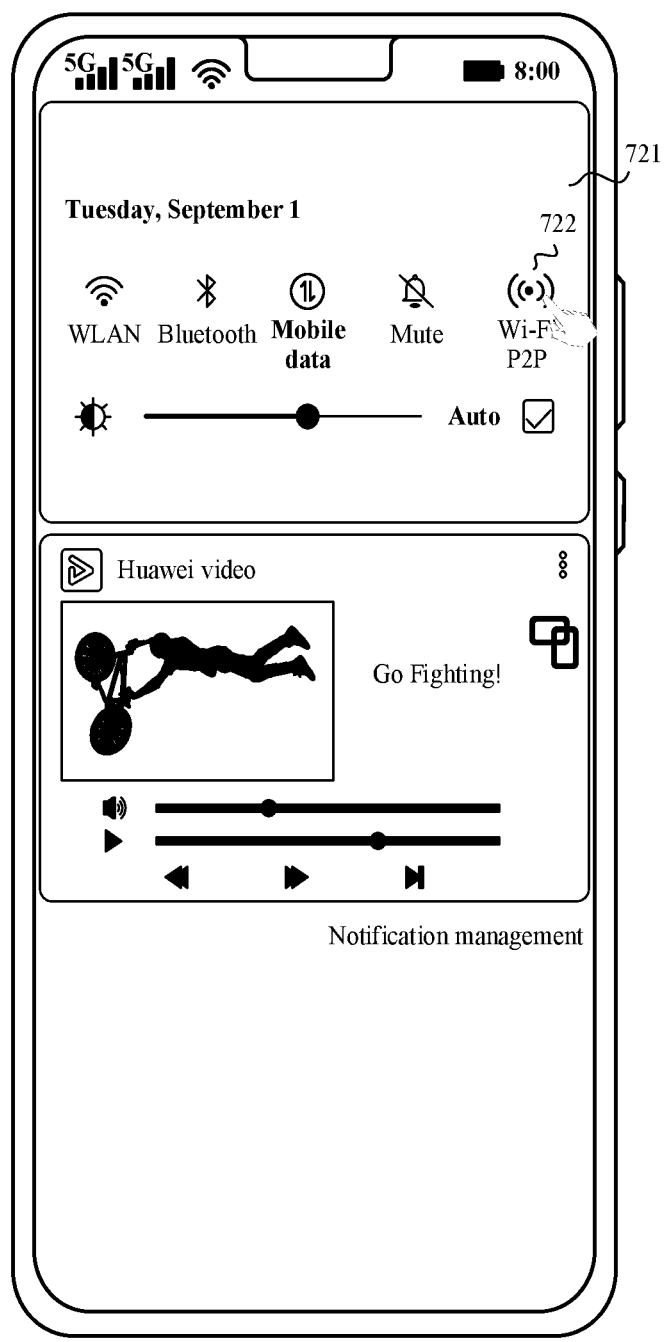

It should be noted that an option of the WI-FI P2P switch in FIG. 7C is merely an example for description. During actual product implementation, the option of the WI-FI P2P switch may alternatively be displayed in another form. This is not limited in this disclosure.

Figure 8:
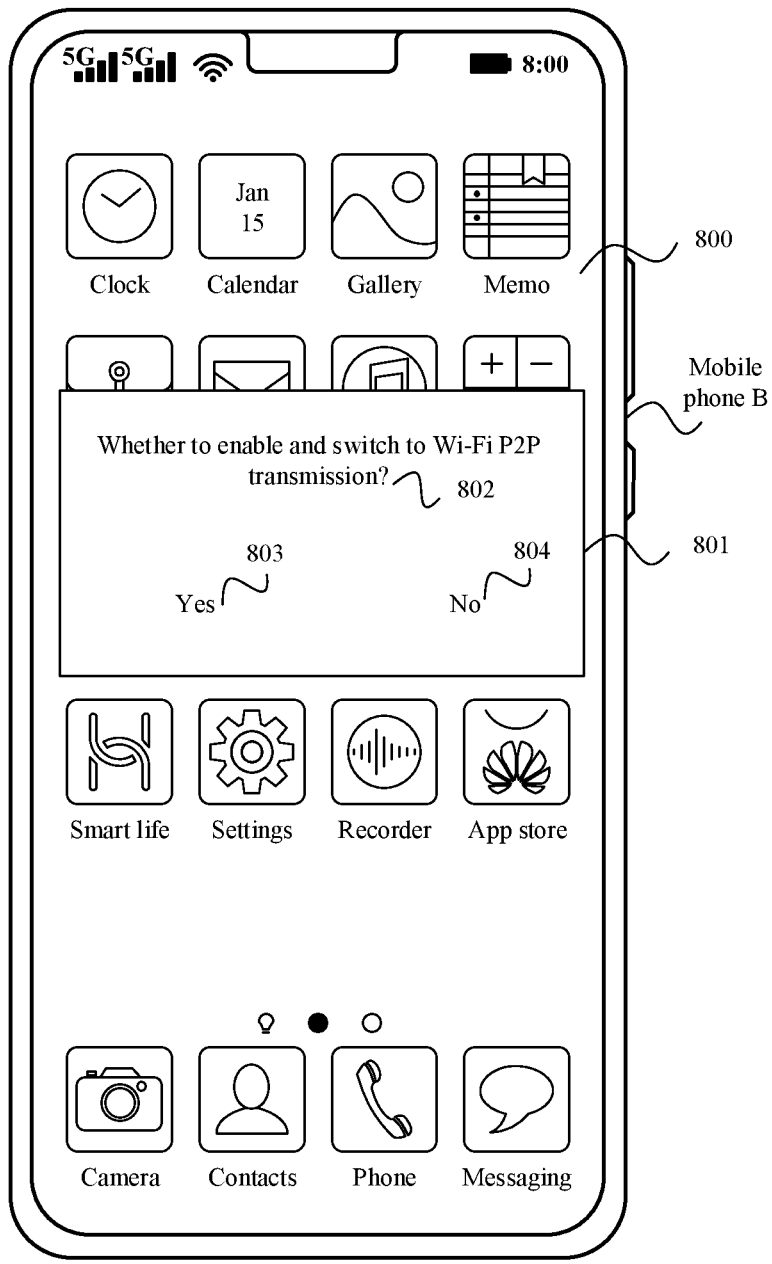
FIG. 8 and FIG. 9A and FIG. 9B are schematic diagrams of user interfaces according to an embodiment of this disclosure.

Further, if the WI-FI P2P transmission manner is not enabled on the mobile phone B, the mobile phone A may send a notification message to the mobile phone B. The notification message may be used to trigger the mobile phone B to prompt the user B whether to switch to WI-FI P2P transmission. For example, as shown in FIG. 8, after the mobile phone B receives the notification message sent by the mobile phone A, a user interface 800 may be displayed on a display of the mobile phone B. The user interface 800 may include a prompt box 801. The prompt box 801 may include a text prompt "whether to enable and switch to WI-FI P2P transmission" 802, a "yes" button 803, and a "no" button 804. When the user B taps the "yes" button 803 on the user interface 800 of the mobile phone B, the mobile phone B may turn on a WI-FI P2P switch in response to the tap operation performed by the user on the "yes" button 803. Certainly, if the user B taps the "no" button 804, the mobile phone A cannot transmit data to the mobile phone B through WI-FI P2P.

If the WI-FI P2P transmission manner is not enabled on the mobile phone A and the mobile phone B, after the "HUAWEI Mate 20" 522 in the available device list on the user interface 520 of the mobile phone A is tapped, the user interface 700 may be displayed on the display of the mobile phone A, to prompt the user that data can be transmitted between the mobile phone A and the mobile phone B in the WI-FI P2P transmission manner. After the user taps the "enable" button 703 on the user interface 700 of the mobile phone A, the mobile phone A may display the user interface 710 to prompt the user that the WI-FI P2P transmission manner is not enabled on the mobile phone A, so that the user enables the WI-FI P2P transmission manner. The display of the mobile phone B may display the user interface 800, and the user may tap the "yes" button 803 on the user interface 800 to enable the WI-FI P2P transmission manner of the mobile phone B.

According to the foregoing solutions, when data is transmitted through BLUETOOTH, if an electronic device is a device that supports WI-FI P2P transmission, a user may freely select a transmission manner, for example, may select to switch BLUETOOTH transmission to WI-FI P2P transmission. In this way, data transmission efficiency can be improved.

Figure 10:
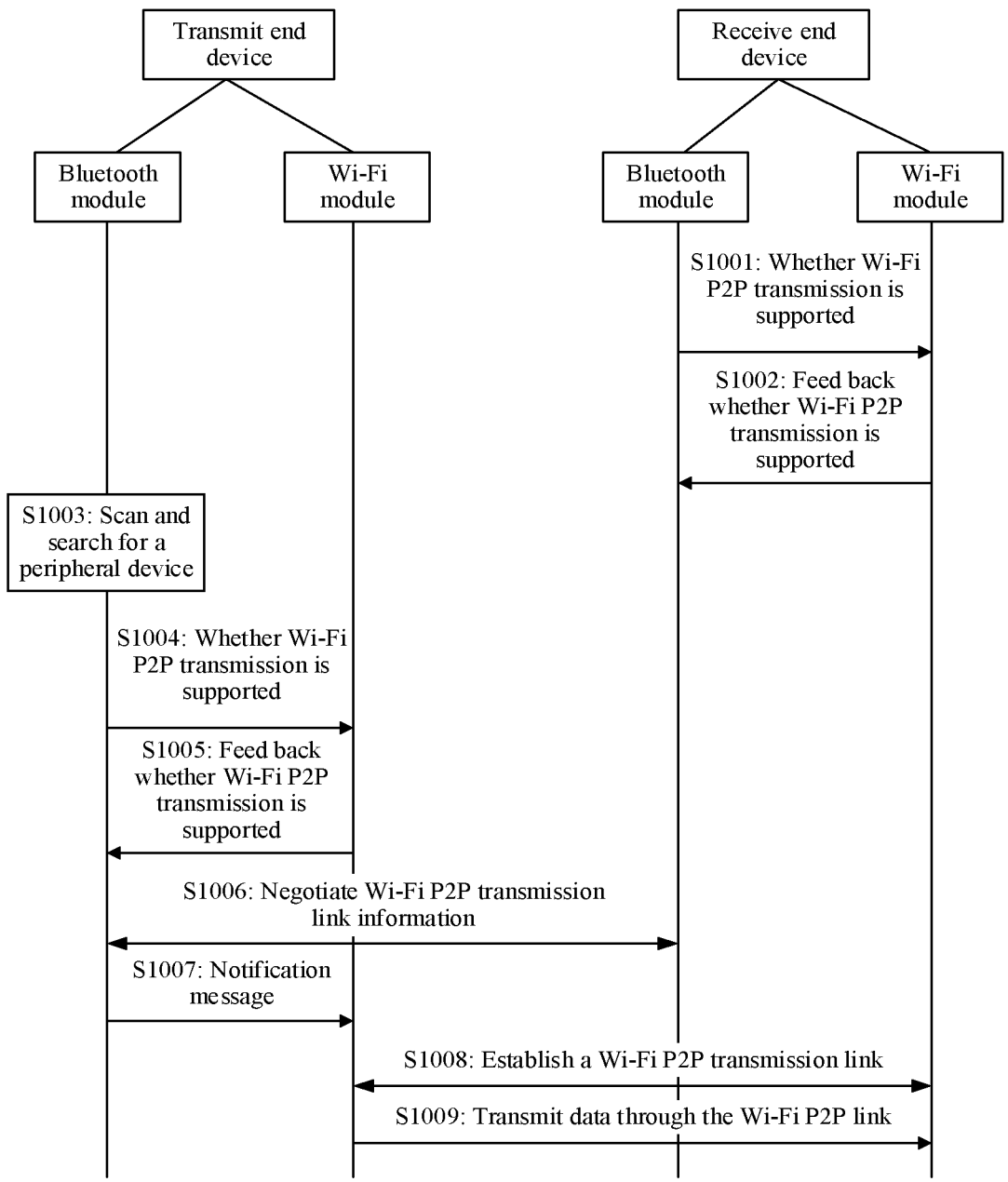
FIG. 10 is an interaction flowchart of a data transmission method according to an embodiment of this disclosure.

FIG. 10 is an interaction flowchart of a data transmission method according to an embodiment of this disclosure. Before the following steps are performed, BLUETOOTH transmission manners of both a transmit end device and a receive end device are enabled. In addition, the embodiment shown in FIG. 10 is described by using an example in which both the transmit end device and the receive end device support WI-FI P2P transmission.

As shown in FIG. 10, the method may include the following steps.

S1001: A BLUETOOTH module of the receive end device queries a WI-FI module of the receive end device whether the receive end device supports WI-FI P2P transmission.

In this embodiment of this disclosure, when the BLUETOOTH transmission manner is enabled, the receive end device may start to query whether the receive end device supports WI-FI P2P transmission.

S1002: The WI-FI module of the receive end device feeds back a result to the BLUETOOTH module. If the receive end device supports WI-FI P2P transmission, the WI-FI module may feed back, to the BLUETOOTH module, that the receive end device supports WI-FI P2P transmission.

In this embodiment of this disclosure, if the receive end device supports WI-FI P2P transmission, a BLUETOOTH broadcast message may carry an identifier (or indication information) indicating that WI-FI P2P transmission is supported, so that the transmit end device can discover the receive end device, and can determine, based on the broadcast message, whether the receive end device supports WI-FI P2P transmission.

S1003: A BLUETOOTH module of the transmit end device scans and searches for a peripheral device, to obtain an available device list (or referred to as a discovered device list).

S1004: The BLUETOOTH module of the transmit end device queries a WI-FI module of the transmit end device whether the transmit end device supports WI-FI P2P transmission.

In this embodiment of this disclosure, when the BLUETOOTH transmission manner is enabled, the transmit end device may start to query whether the transmit end device supports WI-FI P2P transmission.

S1005: The WI-FI module of the transmit end device feeds back a result to the BLUETOOTH module. If the transmit end device supports WI-FI P2P transmission, the WI-FI module may feed back, to the BLUETOOTH module, that the transmit end device supports WI-FI P2P transmission.

After a BLUETOOTH transmission manner is enabled on a device, the device may broadcast an identifier of the device and the like to a peripheral device. Therefore, after the BLUETOOTH transmission manner is enabled, both the transmit end device and the receive end device broadcast information such as identifiers of the transmit end device and the receive end device.

S1006: After the transmit end device selects to-be-transmitted data, selects the BLUETOOTH transmission manner, and selects the receive end device as a receiving device of the to-be-transmitted data, the BLUETOOTH module of the transmit end device and the BLUETOOTH module of the receive end device negotiate WI-FI P2P transmission link information.

In this embodiment of this disclosure, when both the transmit end device and the receive end device support WI-FI P2P transmission, related information about a WI-FI P2P link in an interaction process may be negotiated through a BLUETOOTH channel. The related information about the WI-FI P2P link may include: a primary device, a secondary device, key information, and the like.

S1007: The BLUETOOTH module of the transmit end device sends a notification message to the WI-FI module of the transmit end device, to indicate the WI-FI module of the transmit end device to establish a WI-FI P2P transmission link to the WI-FI module of the receive end device.

After the BLUETOOTH module of the transmit end device and the BLUETOOTH module of the receive end device complete negotiation, the BLUETOOTH module of the transmit end device may send the notification message to the WI-FI module. The notification message is used to indicate the WI-FI module of the transmit end device to establish the WI-FI P2P transmission link between the WI-FI module of the transmit end device and the WI-FI module of the receive end device.

S1008: The WI-FI module of the transmit end device and the WI-FI module of the receive end device establish the WI-FI P2P transmission link, and disconnect a BLUETOOTH transmission link.

S1009: The WI-FI module of the transmit end device transmits data to the WI-FI module of the receive end device through the WI-FI P2P transmission link.

After data transmission is completed, a notification message may be displayed on a display of the transmit end device, so that a user A learns about a transmission status of a file, and a notification message may be displayed on a display of the receive end device, so that a user B learns about a receiving status of the file.

It should be noted that a sequence of performing the foregoing steps S1001 to S1005 is not limited in this disclosure. For example, S1004 may be performed before S1001, or may be performed simultaneously with S1001. This is not limited in this disclosure.

Figure 11:
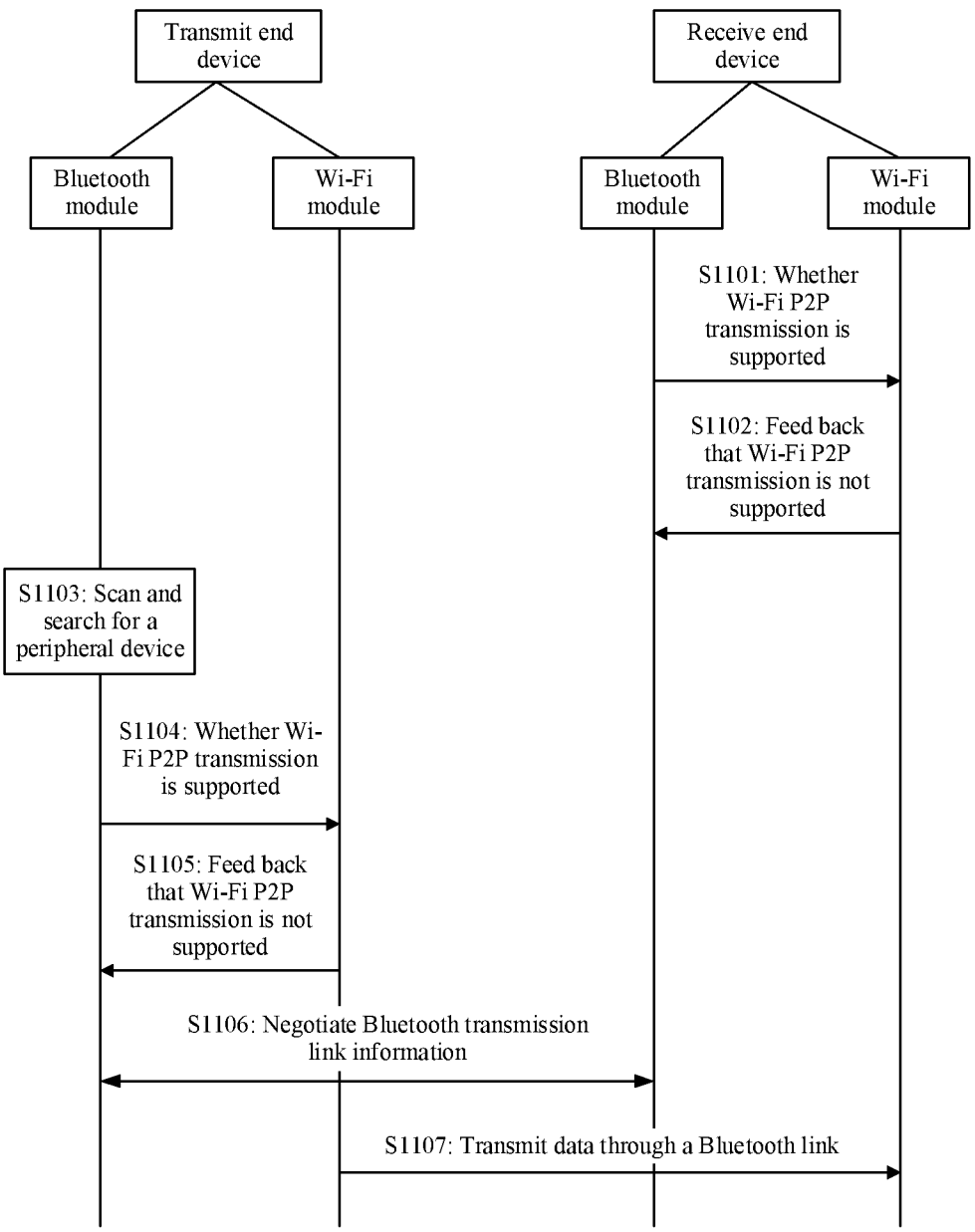
FIG. 11 is an interaction flowchart of another data transmission method according to an embodiment of this disclosure.

FIG. 11 is an interaction flowchart of a data transmission method according to an embodiment of this disclosure. Refer to FIG. 11. The method may include the following steps.

It should be noted that, before the following steps are performed, BLUETOOTH transmission manners of both a transmit end device and a receive end device are enabled. In addition, the embodiment shown in FIG. 11 is described by using an example in which at least one of the transmit end device and the receive end device does not support WI-FI P2P transmission.

As shown in FIG. 11, the method may include the following steps.

S1101: A BLUETOOTH module of the receive end device queries a WI-FI module of the receive end device whether the receive end device supports WI-FI P2P transmission.

S1102: The WI-FI module of the receive end device feeds back a result to the BLUETOOTH module. If the receive end device does not support WI-FI P2P transmission, the WI-FI module may feed back, to the BLUETOOTH module, that the receive end device does not support WI-FI P2P transmission.

In this embodiment of this disclosure, if the receive end device does not support WI-FI P2P transmission, an identifier (or indication information) indicating that WI-FI P2P transmission is not supported may be carried in a BLUETOOTH broadcast, so that the transmit end device can determine a transmission manner based on the identifier or the indication information carried in the broadcast message.

S1103: A BLUETOOTH module of the transmit end device scans and searches for a peripheral device, to obtain an available device list (or referred to as a discovered device list).

S1104: The BLUETOOTH module of the transmit end device queries a WI-FI module of the transmit end device whether the transmit end device supports WI-FI P2P transmission.

In this embodiment of this disclosure, when the BLUETOOTH transmission manner is enabled, the transmit end device may start to query whether the transmit end device supports WI-FI P2P transmission.

S1005: The WI-FI module of the transmit end device feeds back a result to the BLUETOOTH module. If the transmit end device does not support WI-FI P2P transmission, the WI-FI module may feed back, to the BLUETOOTH module, that the transmit end device does not support WI-FI P2P transmission.

After a BLUETOOTH transmission manner is enabled on a device, the device may broadcast an identifier of the device and the like to a peripheral device. Therefore, after the BLUETOOTH transmission manner is enabled, both the transmit end device and the receive end device broadcast information such as identifiers of the transmit end device and the receive end device.

S1106: After the transmit end device selects to-be-transmitted data, selects the BLUETOOTH transmission manner, and selects the receive end device as a receiving device of the to-be-transmitted data, the BLUETOOTH module of the transmit end device and the BLUETOOTH module of the receive end device negotiate BLUETOOTH transmission link information.

In this embodiment of this disclosure, when both the transmit end device and the receive end device support WI-FI P2P transmission, related information about a BLUETOOTH link in an interaction process may be negotiated through a BLUETOOTH channel. The related information about the BLUETOOTH link may include: a primary device, a secondary device, key information, and the like.

S1107: The BLUETOOTH module of the transmit end device transmits data to the BLUETOOTH module of the receive end device through the BLUETOOTH transmission link.

After data transmission is completed, a notification message may be displayed on a display of the transmit end device, to notify a user A that file sending is completed, and a notification message may be displayed on a display of the receive end device, to notify a user B that file receiving is completed.

It should be noted that a sequence of performing the foregoing steps S1101 to S1105 is not limited in this disclosure. For example, S1104 may be performed before S1101, or may be performed simultaneously with S1101. This is not limited in this disclosure.

Figure 12:
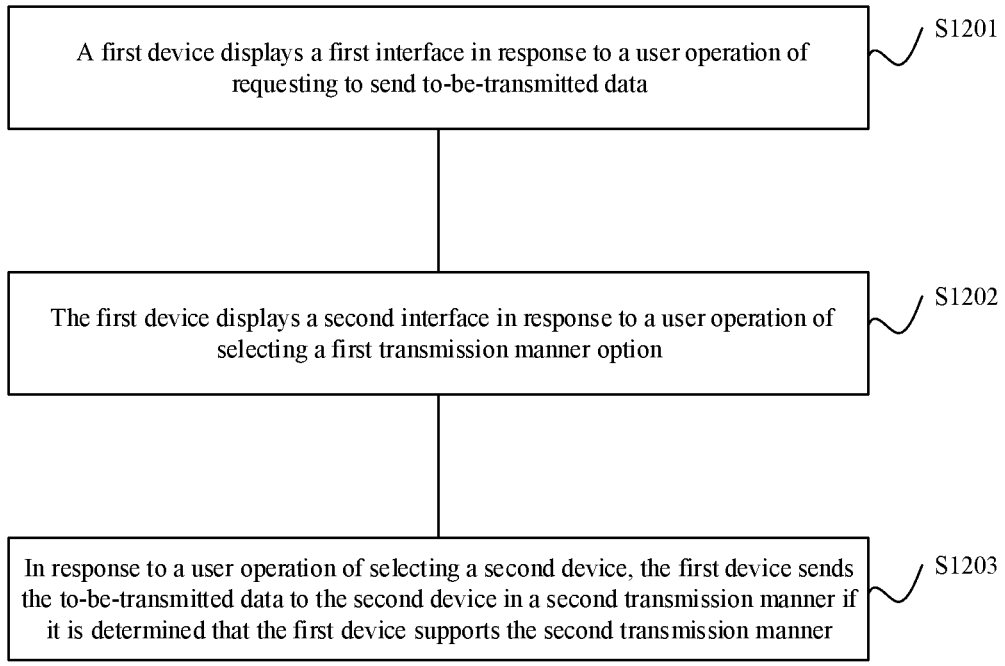
FIG. 12 is a flowchart of a data transmission method according to an embodiment of this disclosure.

Based on the foregoing embodiment, as shown in FIG. 12, an embodiment of this disclosure further provides a data transmission method. Refer to FIG. 12. The method may include the following steps.

S1201: A first device displays a first interface in response to a user operation of requesting to send to-be-transmitted data.

The first interface includes at least one transmission manner option, and the at least one transmission manner option includes a first transmission manner option.

S1202: The first device displays a second interface in response to a user operation of selecting the first transmission manner option.

The second interface includes a discovered device list, the discovered device list may include information about at least one device that is discovered by the first device and that supports a first transmission manner, the information about the at least one device includes identification information of a second device and first indication information, the first indication information is displayed in the discovered device list by the first device based on second indication information carried in a broadcast message from the second device, and the first indication information and the second indication information are used to indicate that the second device supports a second transmission manner.

S1203: In response to a user operation of selecting the second device, the first device sends the to-be-transmitted data to the second device in the second transmission manner if it is determined that the first device supports the second transmission manner.

For specific implementation of the foregoing steps, refer to the detailed description in the foregoing embodiments. Details are not described herein again.

In the foregoing embodiments provided in this disclosure, the method provided in the embodiments of this disclosure is described from a perspective in which an electronic device serves as an execution body. To implement functions in the method provided in the embodiments of this disclosure, the electronic device may include a hardware structure and/or a software module, and implement the functions in a form of the hardware structure, the software module, or a combination of the hardware structure and the software module. Whether a function in the foregoing functions is performed in the form of the hardware structure, the software module, or both the hardware structure and the software module depends on specific applications and design constraint conditions of the technical solutions.

Figure 13:
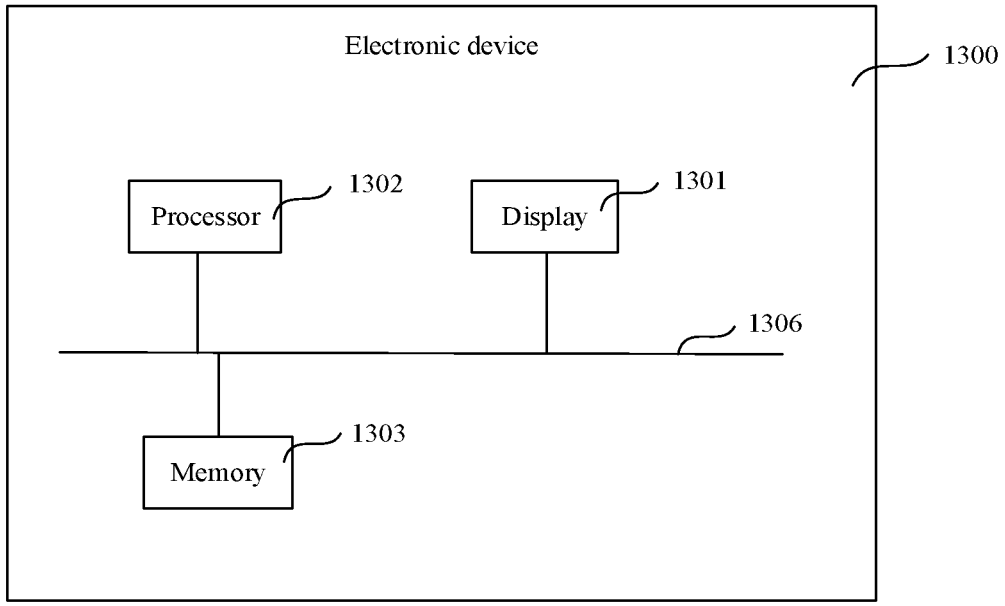
FIG. 13 is a schematic diagram of a structure of another electronic device according to an embodiment of this disclosure.

FIG. 13 is a schematic diagram of a structure of an electronic device according to an embodiment of this disclosure. The device may be an electronic device having a display. For example, the electronic device may be a first device, for example, a mobile phone. With reference to FIG. 13, the electronic device 1300 includes the display 1301, one or more processors 1302, a memory 1303, a plurality of applications 1304 (not shown in the figure), and one or more computer programs 1305 (not shown in the figure). The components may be connected by using one or more communications buses 1306.

The display 1301 is configured to display a display interface and the like of an application in the electronic device.

The memory 1303 stores one or more computer programs. The one or more computer programs include instructions. The processor 1302 invokes the instructions stored in the memory 1303, so that the electronic device 1300 performs the following steps: displaying a first interface in response to a user operation of requesting to send to-be-transmitted data, where the first interface includes at least one transmission manner option, and the at least one transmission manner option includes a first transmission manner option; displaying a second interface in response to a user operation of selecting the first transmission manner option, where the second interface includes a discovered device list, the discovered device list includes information about at least one device that is discovered by the first device and that supports a first transmission manner, the information about the at least one device includes identification information of a second device and first indication information, the first indication information is displayed in the discovered device list by the first device based on second indication information carried in a broadcast message from the second device, and the first indication information and the second indication information are used to indicate that the second device supports a second transmission manner; and in response to a user operation of selecting the second device, sending the to-be-transmitted data to the second device in the second transmission manner if it is determined that the first device supports the second transmission manner.

In a possible implementation, when the instructions are invoked and executed by the one or more processors 1302, the electronic device 1300 is enabled to further perform, before sending the to-be-transmitted data to the second device in the second transmission manner, the following step: negotiating, with the second device through a transmission link in the first transmission manner, information used to establish a transmission link in the second transmission manner.

In a possible implementation, when the instructions are invoked and executed by the one or more processors 1302, the electronic device 1300 is enabled to further perform the following step: disconnecting the transmission link in the first transmission manner after the transmission link in the second transmission manner is established.

In a possible implementation, when the instructions are invoked and executed by the one or more processors 1302, the electronic device 1300 is enabled to further perform the following steps: determining whether the second transmission manner is enabled on the first device; displaying first prompt information on the first device if it is determined that the second transmission manner is not enabled on the first device, where the first prompt information is used to prompt to enable the second transmission manner of the first device; and enabling the second transmission manner of the first device in response to a user operation of enabling the second transmission manner of the first device.

In a possible implementation, the information about the at least one device further includes third indication information; and when the instructions are invoked and executed by the one or more processors 1302, the electronic device 1300 is enabled to further perform the following steps: determining, based on the third indication information, whether the second transmission manner is enabled on the second device, where the third indication information is displayed in the discovered device list by the first device based on fourth indication information carried in the broadcast message from the second device, and the third indication information and the fourth indication information are used to indicate whether the second transmission manner is enabled on the second device; displaying second prompt information on the first device if it is determined that the second transmission manner is not enabled on the second device, where the second prompt information is used to prompt that the second transmission manner is not enabled on the second device; and sending a notification message to the second device, where the notification message is used to trigger the second device to display third prompt information, and the third prompt information is used to prompt to enable the second transmission manner of the second device.

In a possible implementation, when the instructions are invoked and executed by the one or more processors 1302, the electronic device 1300 is enabled to further perform the following step: sending the to-be-transmitted data to the second device in the first transmission manner if it is determined that the first device does not support the second transmission manner.

In a possible implementation, the first transmission manner is a BLUETOOTH transmission manner, and the second transmission manner is a WI-FI P2P transmission manner.

In this embodiment of this disclosure, the processor 1302 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this disclosure. The general-purpose processor may be a microprocessor, another processor, or the like. The steps of the method disclosed with reference to embodiments of this disclosure may be directly performed by a hardware processor, or may be performed by using a combination of hardware in the processor and a software module. The software module may be located in the memory 1303. The processor 1302 reads the program instructions from the memory 1303, and completes the steps of the foregoing methods in combination with the hardware of the processor.

In this embodiment of this disclosure, the memory 1303 may be a nonvolatile memory such as a hard disk drive (HDD) or a solid-state drive (SSD), or may be a volatile memory such as a RAM. The memory may alternatively be any other medium that can be configured to carry or store expected program code in a form of an instruction or a data structure and that can be accessed by a computer. This is not limited thereto. The memory in this embodiment of this disclosure may alternatively be a circuit or any other apparatus that can implement a storage function, and is configured to store instructions and/or data.

It may be clearly understood by a person skilled in the art that, for the purpose of convenient and brief description, for detailed working processes of the foregoing described apparatuses and units, refer to corresponding processes in the foregoing method embodiments. Details are not described herein again.

Based on the foregoing embodiments, an embodiment of this disclosure further provides a chip. The chip is coupled to a memory in an electronic device, to perform the data transmission method according to the embodiments of this disclosure. "Coupling" in this embodiment of this disclosure means that two components are directly or indirectly connected to each other.

Based on the foregoing embodiments, an embodiment of this disclosure further provides a computer storage medium. The computer storage medium stores a computer program. When the computer program is executed by a computer, the computer is enabled to perform the data transmission method according to the foregoing embodiments.

An embodiment of this disclosure further provides a computer program product including instructions. When the computer program product is run on a computer, the computer is enabled to perform the data transmission method according to the foregoing embodiments.

Embodiments of this disclosure are described with reference to the flowcharts and/or block diagrams of the method, the device (system), and the computer program product according to embodiments of this disclosure. It should be understood that instructions may be used to implement each process and/or each block in the flowcharts and/or the block diagrams and a combination of a process and/or a block in the flowcharts and/or the block diagrams. These instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can indicate the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

What is claimed is:

1. A method, comprising:
   displaying, in response to a first user operation of requesting to send to-be-transmitted data, a first interface, wherein the first interface comprises at least one transmission manner option, and wherein the at least one transmission manner option comprises a first transmission manner option;
   displaying, in response to a second user operation of selecting the first transmission manner option, a second interface, wherein the second interface comprises a discovered device list, wherein the discovered device list comprises first information about at least one device that is discovered by a first device and that supports a first transmission manner, wherein the first information comprises identification information of a second device and first indication information, wherein the first indication information is displayed, based on second indication information carried in a broadcast message from the second device, in the discovered device list, and wherein the first indication information and the second indication information indicate that the second device supports a second transmission manner;
   sending, in response to a third user operation of selecting the second device, the to-be-transmitted data to the second device in the second transmission manner when the first device supports the second transmission manner;
   identifying whether the second transmission manner is enabled on the first device;
   displaying first prompt information on the first device when the second transmission manner is not enabled on the first device, wherein the first prompt information prompts enabling the second transmission manner of the first device; and
   enabling, in response to a fourth user operation of enabling the second transmission manner, the second transmission manner.

2. The method of claim 1, wherein before sending the to-be-transmitted data, the method further comprises negotiating, with the second device through a first transmission link in the first transmission manner, second information for establishing a second transmission link in the second transmission manner.

3. The method of claim 2, further comprising disconnecting the first transmission link after the second transmission link is established.

4. The method of claim 1, wherein the first information further comprises third indication information, and wherein the method further comprises:
   identifying, based on the third indication information, whether the second transmission manner is enabled on the second device, wherein the third indication information is displayed, based on fourth indication information carried in the broadcast message, in the discovered device list, and wherein the third indication information and the fourth indication information indicate whether the second transmission manner is enabled on the second device;
   displaying second prompt information on the first device when the second transmission manner is not enabled on the second device, wherein the second prompt information prompts that the second transmission manner is not enabled on the second device; and
   sending a notification message to the second device, wherein the notification message is configured to trigger the second device to display third prompt information, and
   wherein the third prompt information prompts enabling the second transmission manner of the second device.

5. The method of claim 1, further comprising sending the to-be-transmitted data to the second device in the first transmission manner when the first device does not support the second transmission manner.

6. The method of claim 1, wherein the first transmission manner is a BLUETOOTH transmission manner, and wherein the second transmission manner is a WI-FI peer-to-peer (P2P) transmission manner.

7. An electronic device, comprising:
   a memory configured to store instructions; and
   one or more processors coupled to the memory and configured to execute the instructions to:
      display, in response to a first user operation of requesting to send to-be-transmitted data, a first interface, wherein the first interface comprises at least one transmission manner option, and wherein the at least one transmission manner option comprises a first transmission manner option;
      display, in response to a second user operation of selecting the first transmission manner option, a second interface, wherein the second interface comprises a discovered device list, wherein the discovered device list comprises first information about at least one device that is discovered by the electronic device and that supports a first transmission manner, wherein the first information comprises identification information of a second device and first indication information, wherein the first indication information is displayed, based on second indication information carried in a broadcast message from the second device, in the discovered device list, and wherein the first indication information and the second indication information indicate that the second device supports a second transmission manner;
      send, in response to a third user operation of selecting the second device, the to-be-transmitted data to the second device in the second transmission manner when the electronic device supports the second transmission manner;
      identify whether the second transmission manner is enabled on the electronic device;
      display first prompt information on the electronic device when the second transmission manner is not enabled on the electronic device, wherein the first prompt information prompts enabling the second transmission manner of the electronic device; and
      enable, in response to a fourth user operation of enabling the second transmission manner, the second transmission manner.

8. The electronic device of claim 7, wherein the one or more processors are further configured to execute the instructions to negotiate, with the second device through a first transmission link in the first transmission manner, second information for establishing a second transmission link in the second transmission manner.

9. The electronic device of claim 8, wherein the one or more processors are further configured to execute the instructions to disconnect the first transmission link after the second transmission link is established.

10. The electronic device of claim 7, wherein the first information further comprises third indication information, and wherein the one or more processors are further configured to execute the instructions to:
  identify, based on the third indication information, whether the second transmission manner is enabled on the second device, wherein the third indication information is displayed, based on fourth indication information carried in the broadcast message, in the discovered device list, and wherein the third indication information and the fourth indication information indicate whether the second transmission manner is enabled on the second device;
  display second prompt information on the electronic device when the second transmission manner is not enabled on the second device, wherein the second prompt information prompts that the second transmission manner is not enabled on the second device; and
  send a notification message to the second device,
  wherein the notification message is configured to trigger the second device to display third prompt information, and
  wherein the third prompt information prompts enabling the second transmission manner of the second device.

11. The electronic device of claim 7, wherein the one or more processors are further configured to execute the instructions to send the to-be-transmitted data to the second device when the electronic device does not support the second transmission manner.

12. The electronic device of claim 7, wherein the first transmission manner is a BLUETOOTH transmission manner, and wherein the second transmission manner is a WI-FI peer-to-peer (P2P) transmission manner.

13. A method, comprising:
  displaying, in response to a first user operation of requesting to send to-be-transmitted data, a first interface, wherein the first interface comprises at least one transmission manner option, and wherein the at least one transmission manner option comprises a first transmission manner option;
  displaying, in response to a second user operation of selecting the first transmission manner option, a second interface, wherein the second interface comprises a discovered device list, wherein the discovered device list comprises first information about at least one device that is discovered by a first device and that supports a first transmission manner, wherein the first information comprises identification information of a second device, first indication information, and third indication information, wherein the first indication information is displayed, based on second indication information carried in a broadcast message from the second device, in the discovered device list, and wherein the first indication information and the second indication information indicate that the second device supports a second transmission manner;
  sending, in response to a third user operation of selecting the second device, the to-be-transmitted data to the second device in the second transmission manner when the first device supports the second transmission manner;
  identifying, based on the third indication information, whether the second transmission manner is enabled on the second device, wherein the third indication information is displayed, based on fourth indication information carried in the broadcast message, in the discovered device list, and wherein the third indication information and the fourth indication information indicate whether the second transmission manner is enabled on the second device;
  displaying second prompt information on the first device when the second transmission manner is not enabled on the second device, wherein the second prompt information prompts that the second transmission manner is not enabled on the second device; and
  sending a notification message to the second device,
  wherein the notification message is configured to trigger the second device to display third prompt information, and
  wherein the third prompt information prompts enabling the second transmission manner of the second device.

14. The method of claim 13, wherein before sending the to-be-transmitted data, the method further comprises negotiating, with the second device through a first transmission link in the first transmission manner, second information for establishing a second transmission link in the second transmission manner.

15. The method of claim 14, further comprising disconnecting the first transmission link after the second transmission link is established.

16. The method of claim 13, further comprising sending the to-be-transmitted data to the second device in the first transmission manner when the first device does not support the second transmission manner.

17. The method of claim 13, wherein the first transmission manner is a BLUETOOTH transmission manner, and wherein the second transmission manner is a WI-FI peer-to-peer (P2P) transmission manner.

18. An electronic device, comprising:
  a memory configured to store instructions; and
  one or more processors coupled to the memory and configured to execute the instructions to:
    display, in response to a first user operation of requesting to send to-be-transmitted data, a first interface, wherein the first interface comprises at least one transmission manner option, and wherein the at least one transmission manner option comprises a first transmission manner option;
    display, in response to a second user operation of selecting the first transmission manner option, a second interface, wherein the second interface comprises a discovered device list, wherein the discovered device list comprises first information about at least one device that is discovered by the electronic device and that supports a first transmission manner, wherein the first information comprises identification information of a second device, first indication information, and third indication information, wherein the first indication information is displayed, based on second indication information carried in a broadcast message from the second device, in the discovered device list, and wherein the first indication information and the second indication information indicate that the second device supports a second transmission manner;
    send, in response to a third user operation of selecting the second device, the to-be-transmitted data to the second device in the second transmission manner when the electronic device supports the second transmission manner;
    identify, based on the third indication information, whether the second transmission manner is enabled on the second device, wherein the third indication information is displayed, based on fourth indication information carried in the broadcast message, in the discovered device list, and wherein the third indication information and the fourth indication information indicate whether the second transmission manner is enabled on the second device;

display second prompt information on the electronic device when the second transmission manner is not enabled on the second device, wherein the second prompt information prompts that the second transmission manner is not enabled on the second device; and send a notification message to the second device, wherein the notification message is configured to trigger the second device to display third prompt information, and wherein the third prompt information prompts enabling the second transmission manner of the second device.

19. The electronic device of claim 18, wherein the one or more processors are further configured to execute the instructions to negotiate, with the second device through a first transmission link in the first transmission manner, second information for establishing a second transmission link in the second transmission manner.

* * * * *